United States Patent
Jeon et al.

(10) Patent No.: US 11,310,861 B2
(45) Date of Patent: Apr. 19, 2022

(54) BANDWIDTH PART CONFIGURATION AND OPERATION FOR NEW RADIO (NR) WIDEBAND USER EQUIPMENT (UE)

(71) Applicant: APPLE INC., Cupertino, CA (US)

(72) Inventors: Jeongho Jeon, San Jose, CA (US); Joonyoung Cho, Portland, OR (US); Hwan-Joon Kwon, Portland, OR (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 16/484,802

(22) PCT Filed: May 4, 2018

(86) PCT No.: PCT/US2018/031251
§ 371 (c)(1),
(2) Date: Aug. 8, 2019

(87) PCT Pub. No.: WO2018/204884
PCT Pub. Date: Nov. 8, 2018

(65) Prior Publication Data
US 2019/0373667 A1 Dec. 5, 2019

Related U.S. Application Data

(60) Provisional application No. 62/521,108, filed on Jun. 16, 2017, provisional application No. 62/502,512, filed on May 5, 2017.

(51) Int. Cl.
*H04W 72/04* (2009.01)
*H04W 28/20* (2009.01)
(Continued)

(52) U.S. Cl.
CPC ......... *H04W 76/27* (2018.02); *H04L 27/2605* (2013.01); *H04L 49/25* (2013.01); *H04W 72/1289* (2013.01)

(58) Field of Classification Search
CPC ......... H04W 74/0833; H04W 72/1273; H04W 76/27; H04W 72/043; H04W 76/38; H04W 72/02
(Continued)

(56) References Cited

U.S. PATENT DOCUMENTS

2012/0327874 A1 12/2012 Eriksson et al.
2013/0182672 A1 7/2013 Kakishima et al.
(Continued)

FOREIGN PATENT DOCUMENTS

CN 102771098 A 11/2012
CN 106487779 A 3/2017

OTHER PUBLICATIONS

Huawei, Hisilicon, "Resource allocation and indication for data channel", R1-1705069, 3GPP TSG RAN WG1 Meeting #88bis, Spokane, Washington, USA, Apr. 3-7, 2017, 8 pages.
(Continued)

*Primary Examiner* — Syed Ali
*Assistant Examiner* — Jason A Harley
(74) *Attorney, Agent, or Firm* — Stoel Rives LLP

(57) ABSTRACT

Technology for a user equipment (UE) operable for bandwidth part (BWP) configuration is disclosed. The UE can decode, at the UE, a radio resource control (RRC) signal including BWP configuration information for one or more of downlink (DL) or uplink (UL) BWP configurations, wherein the BWP configuration information comprises: subcarrier spacing for the BWP, and location and bandwidth of the BWP. The UE can encode one or more of data or control information, using the BWP configuration information, for transmission to a next generation node B (gNB). The UE can decode one or more of data or control information, using the BWP configuration information, received from the gNB.

23 Claims, 19 Drawing Sheets

(51) Int. Cl.
*H04W 76/38* (2018.01)
*H04W 72/00* (2009.01)
*H04W 24/10* (2009.01)
*H04W 76/27* (2018.01)
*H04L 27/26* (2006.01)
*H04L 49/25* (2022.01)
*H04W 72/12* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2015/0030008 | A1* | 1/2015 | Lee | H04W 72/0446 370/336 |
| 2016/0204905 | A1* | 7/2016 | Lee | H04L 5/0055 370/329 |
| 2017/0250786 | A1* | 8/2017 | Better | H04L 5/005 |
| 2018/0070341 | A1* | 3/2018 | Islam | H04L 1/1887 |
| 2018/0183551 | A1* | 6/2018 | Chou | H04L 5/0098 |
| 2018/0270699 | A1* | 9/2018 | Babaei | H04W 72/1284 |
| 2018/0279358 | A1* | 9/2018 | Babaei | H04W 72/0453 |
| 2018/0324830 | A1* | 11/2018 | Islam | H04W 72/1236 |
| 2019/0289668 | A1* | 9/2019 | He | H04L 5/0098 |
| 2020/0314893 | A1* | 10/2020 | Chou | H04W 74/04 |

OTHER PUBLICATIONS

R1-1705069; 3GPP TSG RAN WG1 Mtg #88bis; Title: REsource allocation and indication for data channel; Source: Huawei, HiSilicon; Agenda Item: 8.1.3.3.1; Spokane, USA; Apr. 3-7, 2017.

R2-1704503; 3GPP TSG-RAN WG2 NR Mtg #98; Title: RAN2 impacts from bandwitdth part in NR; Source: Samsung; Agenda Item: 10.3.1.10; Hangzhou, China; May 15-19, 2017.

* cited by examiner

BANDWIDTH PART CONFIGURATION AND OPERATION FOR NEW RADIO (NR) WIDEBAND USER EQUIPMENT (UE)

BACKGROUND

Wireless systems typically include multiple User Equipment (UE) devices communicatively coupled to one or more Base Stations (BS). The one or more BSs may be Long Term Evolved (LTE) evolved NodeBs (eNB) or new radio (NR) NodeBs (gNB) or next generation node Bs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
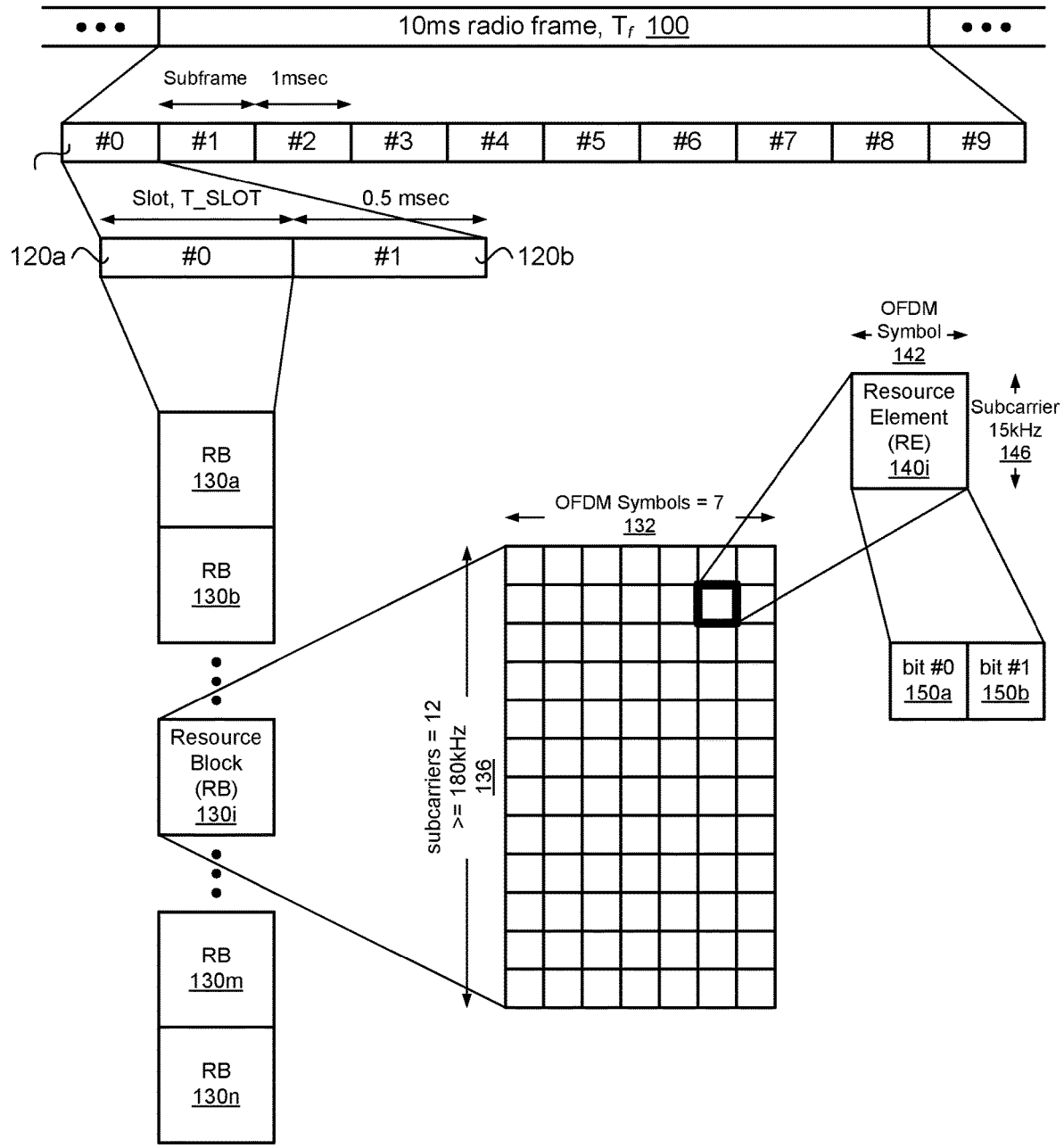
FIG. 1 illustrates a block diagram of an orthogonal frequency division multiple access (OFDMA) frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The power consumption of radio frequency (RF) converters, analog to digital (A/D) converters, and digital to analog (D/A) converters, as well as the power consumption of the digital front end, can scale with the RF bandwidth. As the RF bandwidth increases, the power consumption can increase. In addition, the baseband power consumption can scale with the bit rate. As the bit rate increases, the baseband power consumption can increase.

In New Radio (NR) there is an increasing demand for wide bandwidth operation. For example, in 4G communications, the maximum bandwidth of a component carrier is 20 megahertz. In 3GPP 5G communications systems, each component carrier may have a much greater maximum bandwidth. For example, a component carrier may have a bandwidth of 100 megahertz (MHz), 200 MHz, 400 MHz, or more. A wide bandwidth, such as 400 MHz, can result in high power consumption not only at high data rates, when the full bandwidth is being utilized, but also at low data rates or during idling because of the power consumption used in monitoring the wide RF bandwidth for control channel and data communications.

Therefore, it can be desirable to scale the operating bandwidth with the data rate. A high data rate can still utilize a high operating bandwidth, but a low data rate can utilize a low operating bandwidth. Having the operating bandwidth adjustment depend on the data rate can reduce the user equipment (UE) power consumption at low data rates or during idling.

One way of addressing this problem is by using a bandwidth part (BWP). When a BWP is configured for a UE, then the UE can transmit and receive data within the BWP without transmitting or receiving data outside of the configured frequency range. This can scale the operating bandwidth with the data rate which can reduce the UE power consumption at low data rates or during idling.

FIG. 1 provides an example of a 3GPP LTE Release 8 frame structure. In particular, FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. The first slot (#0) 120$a$ can include a legacy physical downlink control channel (PDCCH) 160 and/or a physical downlink shared channel (PDSCH) 166, and the second slot (#1) 120$b$ can include data transmitted using the PDSCH.

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first Orthogonal Frequency Division Multiplexing (OFDM) symbols in each subframe or RB, when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 130$i$ can include 12-15 kilohertz (kHz) subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP LTE Release 8 frame structure provides examples of the way in which data is transmitted, or the transmission mode. The example is not intended to be limiting. Many of the Release 8 features will evolve and change in 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband) 204, mMTC (massive Machine Type Communications or massive IoT) 202 and URLLC (Ultra Reliable Low Latency Communications or Critical Communications) 206. The carrier in a 5G system can be above or below 6 GHz. In one embodiment, each network service can have a different numerology.

Figure 2:
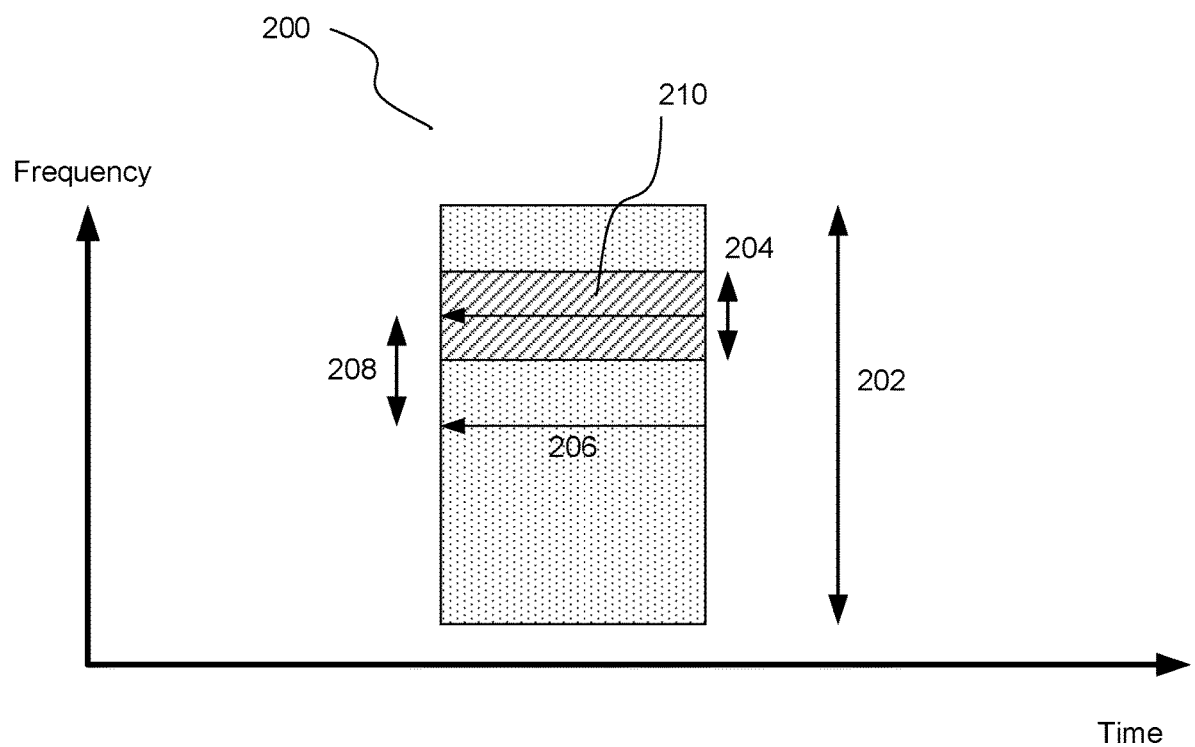
FIG. 2 illustrates bandwidth part (BWP) configuration in accordance with an example.

In another example, as illustrated in FIG. 2, a BWP can be configured 200. The BWP can be configured via a higher layer signal (e.g. a radio resource control (RRC) signal) that includes BWP configuration information for one or more of downlink (DL) or uplink (UL) BWP configurations. The numerology of the BWP can include subcarrier spacing and/or slot duration and/or a cyclic prefix (CP). The subcarrier spacing can be defined in relation to a base subcarrier spacing. For example, the base subcarrier spacing can be 15 kilohertz (kHz). The slot duration can indicate the duration of time for each slot in the time domain. The slot duration can depend on the 5G numerology being used, such as eMBB, mMTC, URLLC, or another desired numerology. The CP can be a normal cyclic prefix or an extended cyclic prefix. A normal CP can be supported for all numerologies and slot formats. An extended CP may only be supported for 60 kHz subcarrier spacing.

In another example, the frequency location 210 of the BWP and the bandwidth 204 of the BWP can be indicated in various ways. In one example, the center frequency 210 of the BWP and the bandwidth 204 of the BWP can be indicated. The center frequency 210 of the BWP can be indicated as the absolute frequency of the center of the BWP. The frequency location 210 of the BWP and the bandwidth 204 of the BWP can be indicated via a higher layer signal (e.g. an RRC signal) that includes BWP configuration information for one or more of downlink (DL) or uplink (UL) BWP configurations.

Alternatively, in another example, the center frequency of the BWP 210 can be indicated as a relative offset 208 from the reference frequency 206 of the component carrier. The reference frequency 206 can be the center of the component carrier, a direct current (DC) subcarrier location, either of the edges of the component carrier, or any other predetermined location. The DC subcarrier location can be located somewhere other than the center of the component carrier. The offset can be indicated in units of physical resource blocks (PRBs) or in units of bandwidth, e.g. hertz (Hz). The offset can be indicated via a higher layer signal (e.g. an RRC signal) that includes BWP configuration information for one or more of downlink (DL) or uplink (UL) BWP configurations.

In another example, the bandwidth 204 of the BWP can be indicated in units of physical resource blocks (PRBs) or in units of bandwidth, e.g. hertz (Hz). In one example, there can be a minimum bandwidth that can be signaled. For example, the minimum bandwidth can be 5 MHz, 1.4 MHz, or another desired minimum bandwidth. The bandwidth 204 of the BWP in units of PRBs or in units of bandwidth can be indicated via a higher layer signal (e.g. an RRC signal) that includes BWP configuration information for one or more of downlink (DL) or uplink (UL) BWP configurations.

In another example, both edges of the BWP can be indicated. In this example, each of the edge frequencies can be indicated in various ways. In one example, the absolute frequency of the center of the BWP can be indicated. In another example, each of the edge frequencies can be indicated as the relative offset from the reference frequency. The reference frequency 206 can be the center of the component carrier, a DC subcarrier location, either of the edges of the component carrier, or any other predetermined location. Each of the edge frequencies can be indicated via a higher layer signal (e.g. an RRC signal) that includes BWP configuration information for one or more of downlink (DL) or uplink (UL) BWP configurations.

In another example, the numerology, frequency location, and bandwidth of the BWP can be configured by a higher layer signal, such as radio resource control (RRC) signaling. The RRC signaling can be either UE specific or cell specific.

In another example, a UE can encode one or more of data or control information, using BWP configuration information, for transmission to a gNB. In another example, a UE can decode one or more of data or control information, using BWP configuration information, received from a gNB.

In another example, a gNB can decode one or more of data or control information, using BWP configuration information, received from a UE. In another example, a gNB can encode one or more of data or control information, using BWP configuration information, for transmission to a UE.

In another example, the number of BWPs that can be configured for a particular UE can be limited to a certain number, i.e. N configurations. Therefore, the number of BWPs for each UE can have a maximum number of configurations. This maximum number, N, can be a positive integer. In one example, N can be 2, 4, 8, or 16. Using a maximum number of BWP configurations can ease the design of the bandwidth part switching command because the number of bits used for BWP indication can be fixed at a particular value.

In another example, the BWP can be commonly applied (or jointly configured) to both the downlink (DL) and uplink (UL) in the case of unpaired spectrum or time division duplex (TDD). The BWP can be separately applied (or separately configured) to both the DL and the UL in the case of paired spectrum or frequency division duplex (FDD). In some cases, the BWP can be separately applied (or separately configured) to both the DL and the UL in the case of unpaired spectrum or TDD.

Figure 3:
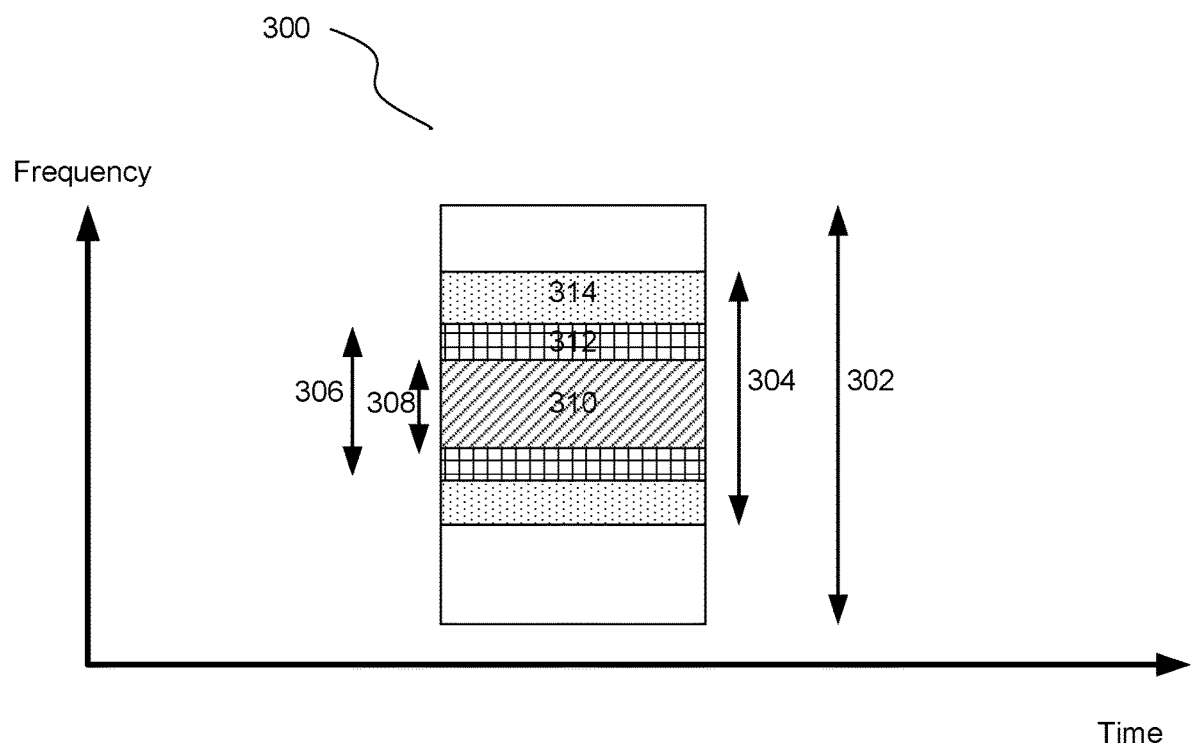
FIG. 3 illustrates overlapping bandwidth part (BWP) configuration in accordance with an example.

In another example, as illustrated in FIG. 3, different BWPs can have overlapping frequency ranges. The frequency ranges of the different BWPs can partially overlap or entirely overlap. BWP 310 has a bandwidth of 308 and includes a subset of the component carrier bandwidth 302. BWP 312 has a bandwidth of 306 and includes a subset of the component carrier bandwidth 302. BWP 314 has a bandwidth of 304 and includes a subset of the component carrier bandwidth 302. The frequency range of BWP 310 overlaps with the frequency range of BWP 312 and BWP 314. The frequency range of BWP 312 overlaps with the frequency range of BWP 310 and BWP 314. The frequency range of BWP 314 overlaps with the frequency range of BWP 310 and BWP 312.

In another example, it can be advantageous to configure overlapping BWPs as opposed to disjoint BWPs because of reduced signaling overhead. In the case of disjoint BWPs, activation signaling for multiple bandwidth parts can be used. In the case of overlapping BWPs, a wide BWP can be RRC configured and activated with a single indication.

Figure 4A:
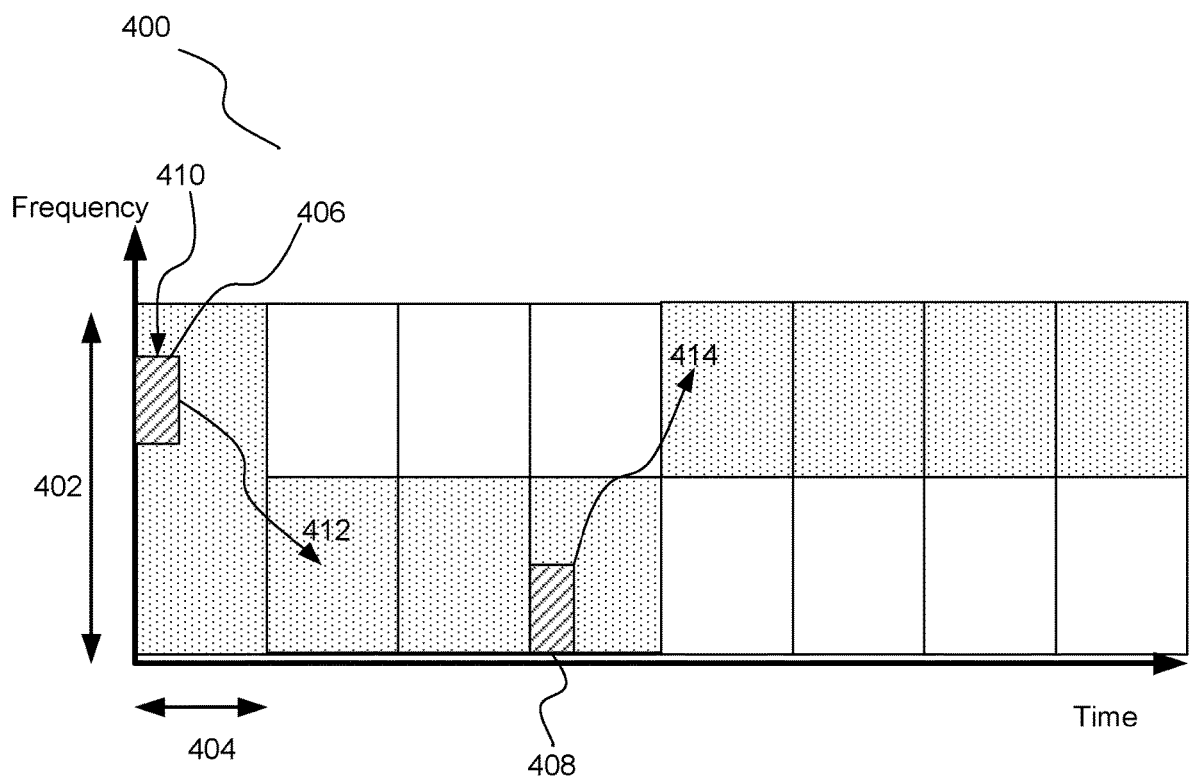
FIG. 4a illustrates bandwidth part (BWP) adaptation operation in accordance with an example.

One example, as illustrated in FIG. 4a, shows a BWP adaptation operation 400. When carriers are aggregated, then each carrier can be referred to as a component carrier (CC). The CC bandwidth 402, as shown in the frequency domain, can be large for wide bandwidth operation. The slot duration 404 can indicate the duration of time for each slot in the time domain. The BWP 406 can include a subset of the bandwidth of the CC bandwidth 402 and a subset of the slot duration 404. A bandwidth part adaptation command 410 can switch the BWP from BWP 406 to BWP 408 as shown in operation 412. BWP 408 can include a subset of the bandwidth of the CC bandwidth 402 and a subset of the slot duration 404. In this example, there are two slot durations during which the BWP has not switched. After the BWP 406 has been switched to BWP 408 in operation 412, then the BWP 408 can be switched back to include the same frequency and time resources occupied by BWP 406 as shown in operation 414.

Figure 4B:
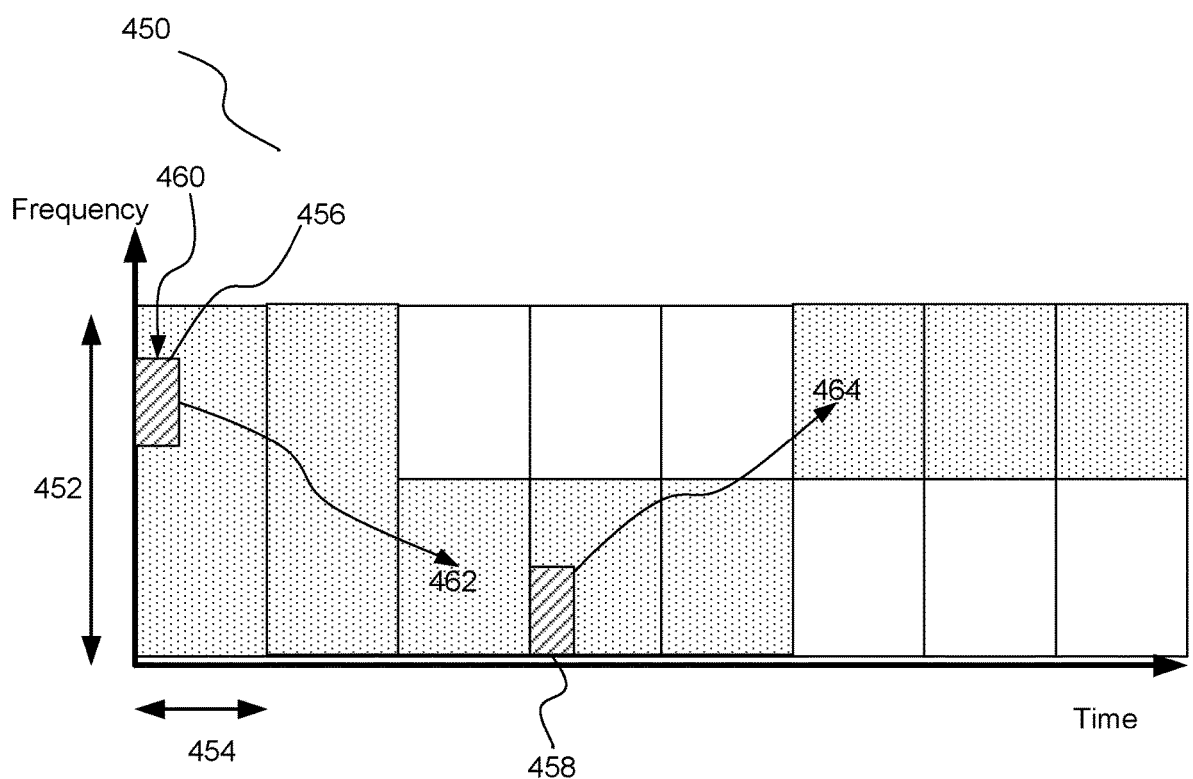
FIG. 4b illustrates bandwidth part (BWP) switching time in accordance with an example.

In another example, as illustrated in FIG. 4b, BWP switching can involve the processing time of a bandwidth part switching command, the settling time of the RF retuning, the A/D conversion time, the D/A conversion time, the time used for automatic gain control (AGC), and other factors. The total amount of time can depend on each UE implementation.

In another example, the supported switching time can be a UE capability and the UE can signal to the gNB the supported switching time. In the example of FIG. 4a, the amount of processing time is within a configured slot duration, i.e. the operation 412 can be processed within a configured slot duration.

In another example, as illustrated in FIG. 4b, the supported switching time can be within the duration of two slots but greater than one slot duration. FIG. 4b shows a BWP adaptation operation 450. The CC bandwidth 452, as shown in the frequency domain, can be large for wide bandwidth operation. The slot duration 454 can indicate the duration of time for each slot in the time domain. The BWP 456 can include a subset of the bandwidth of the CC bandwidth 452 and a subset of the slot duration 454. A bandwidth part adaptation command 460 can switch the BWP from BWP 456 to BWP 458 as shown in operation 462. Operation 462 can be within the duration of two slots but greater than one slot duration. BWP 458 can include a subset of the bandwidth of the CC bandwidth 452 and a subset of the slot duration 454. In this example, there are two slot durations during which the BWP has not switched. After the BWP 456 has been switched to BWP 458 in operation 462, then the BWP 458 can be switched back to include the same frequency and time resources occupied by BWP 456 as shown in operation 464.

In one example, the switching time can be defined as the number of slots used for BWP switching. A UE can have a default switching time, which can be the UE capability signaled switching time. A UE can also be configured via RRC signaling about the default switching time. A UE can also be dynamically indicated about the switching time and/or the bandwidth part switching command.

Figure 5:
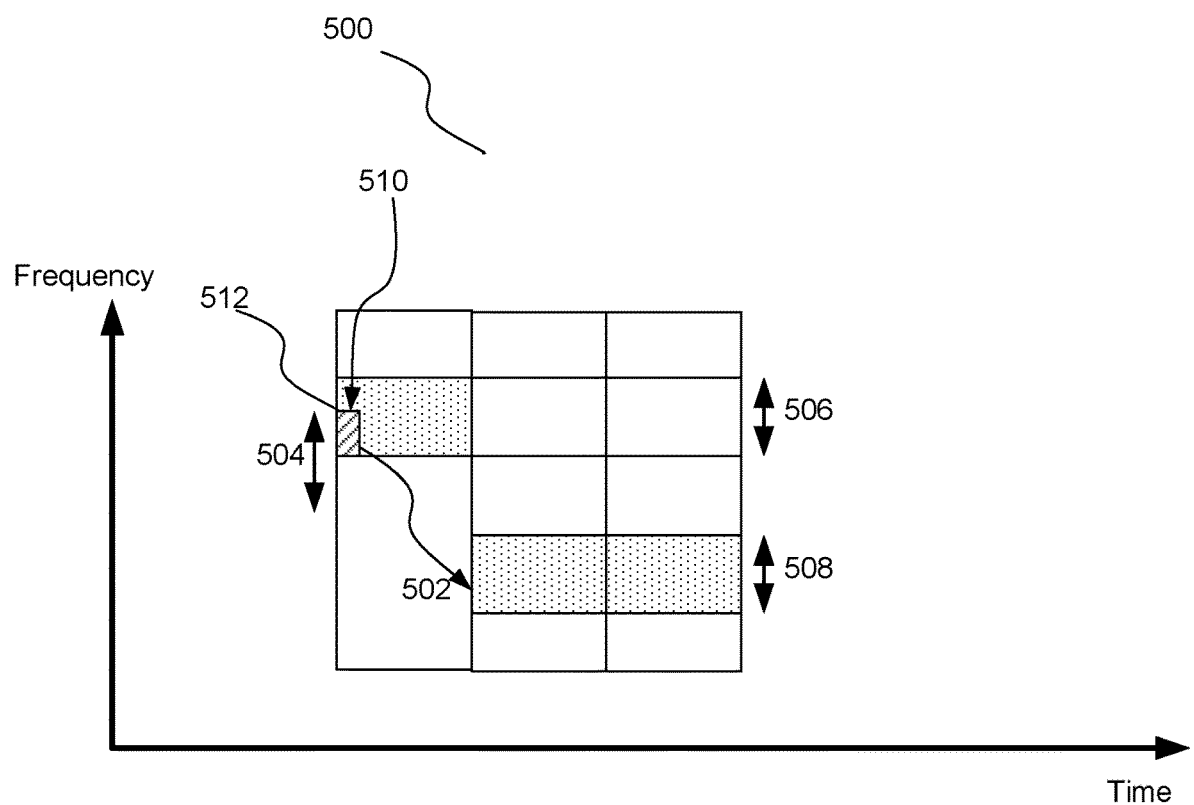
FIG. 5 illustrates a missed bandwidth part (BWP) switching command in accordance with an example.

In another example, as illustrated in FIG. 5, a UE can miss a switching command 510. When a UE misses the switching command 510, the UE can still assume that the same BWP 512 is in use within the frequency resources indicated by 506. Under these circumstances, the gNB might assume that the UE has switched to a different BWP within the frequency resources indicated by 508. As a result, the UE might not be able to receive any control messages. Without being able to receive the proper control messages from the gNB, the UE might not be able to receive any data.

The problem that arises when the UE and gNB are not able to properly communicate control information and data because each of the UE and the gNB are configured to use different BWPs can be addressed in various ways. In one example, a default BWP can be configured to be communicated by the gNB. The default BWP can be communicated via a higher layer signal, such as a radio resource control (RRC) signal. In this example, a UE can be configured to switch to a default BWP after failing to receive a message for a certain period of time, e.g. x milliseconds or n slots, wherein x is a positive number and n is a positive integer.

The gNB can be configured to communicate a switching timer to the UE. The switching timer can be communicated via a higher layer signal, such as an RRC signal. The switching timer can indicate whether a UE can switch to a default BWP. The switching timer can be started at the UE when the UE switches to an active BWP that is not a default BWP. The switching timer can be restarted at the UE, when the UE successfully decodes control information. The control information can comprise downlink control information (DCI) used to schedule a physical downlink shared channel (PDSCH) in the active DL BWP. An active BWP can be a BWP that is one of N BWP configurations, wherein N is a positive integer. The default BWP can be a BWP that is one of the N BWP configurations. The switching timer can expire after a certain period of time, e.g. x milliseconds or n slots, wherein x is a positive number and n is a positive integer. This switching timer value can be a fixed value or the switching timer value can be indicated along with the switching command. After the expiration of the switching timer, the UE can switch to default BWP. By switching to a default BWP when the switching timer expires, the problem that arises when the UE and gNB might not be able to properly communicate control information and data because each of the UE and the gNB are configured to use different BWPs can be resolved.

In another example, the simultaneous activation of different BWPs might not be supported. In this example, for the N BWP configurations, there can be one active downlink (DL) BWP configuration and one active uplink (UL) BWP configuration.

In another example, the simultaneous activation of different BWPs can be supported. However, in this example, if the BWPs have different numerology attributes, i.e. different subcarrier spacing and/or slot duration, then simultaneous activation may not be supported.

In another example, known as explicit signaling, downlink control information (DCI) can be used to indicate to the UE which BWP to switch to. In another example, known as implicit signaling, if the scheduled physical downlink shared channel (PDSCH) is assigned outside of the active BWP, then the UE can switch to a BWP that contains the scheduled PDSCH.

Figure 6A:
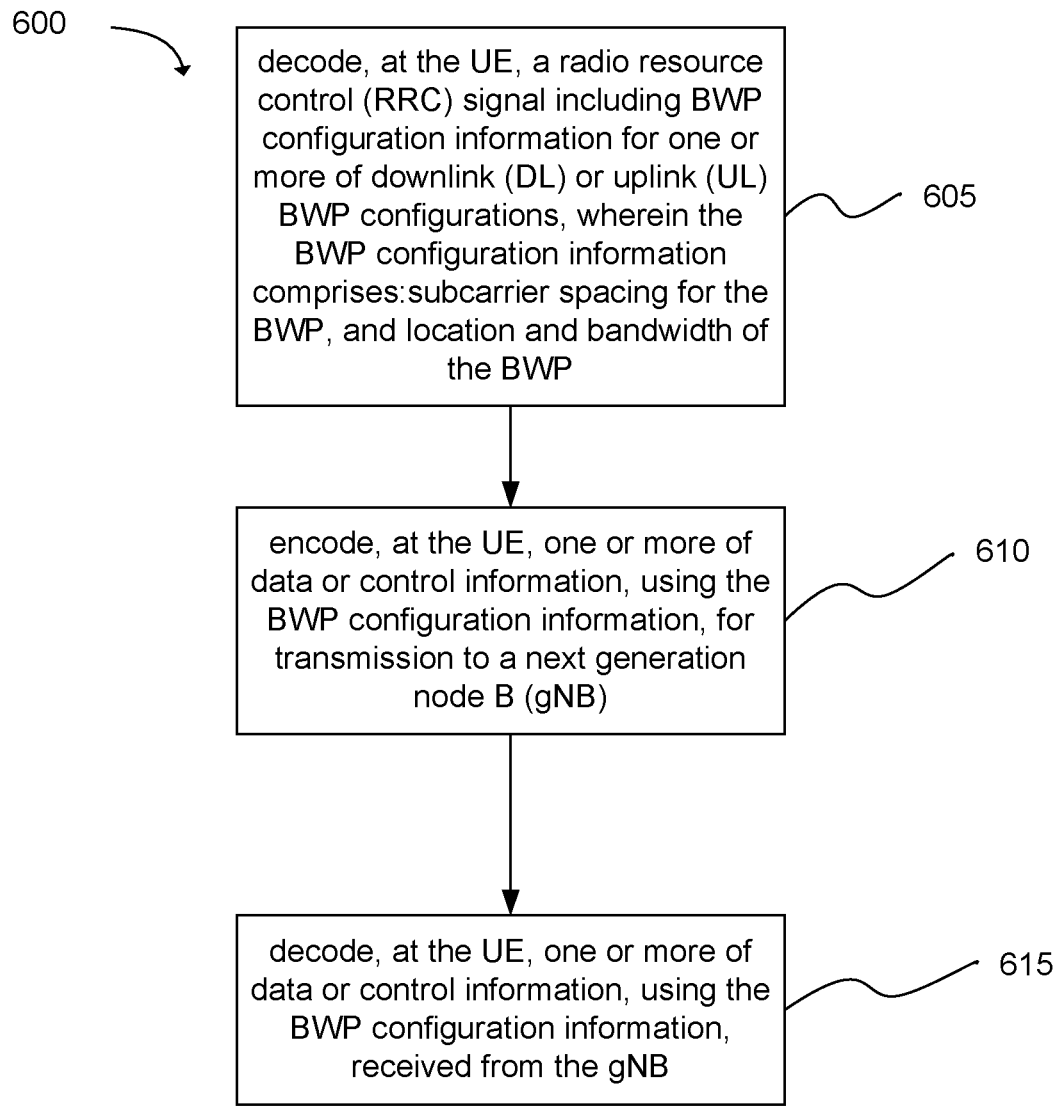
FIG. 6a depicts functionality of a user equipment (UE) operable for bandwidth part (BWP) configuration in accordance with an example.

Another example provides functionality 600 of a user equipment (UE) operable for bandwidth part (BWP) configuration, as shown in FIG. 6a. The UE can comprise one or more processors. The one or more processors can be configured to decode, at the UE, a radio resource control (RRC) signal including BWP configuration information for one or more of downlink (DL) or uplink (UL) BWP configurations, wherein the BWP configuration information comprises: subcarrier spacing for the BWP, and location and bandwidth of the BWP, as in block 605. The one or more processors can be configured to encode, at the UE, one or more of data or control information, using the BWP configuration information, for transmission to a next generation node B (gNB), as in block 610. The one or more processors can be configured to decode, at the UE, one or more of data or control information, using the BWP configuration information, received from the gNB, as in block 615. In addition, the UE can comprise a memory interface configured to send the BWP configuration information to a memory.

Figure 6B:
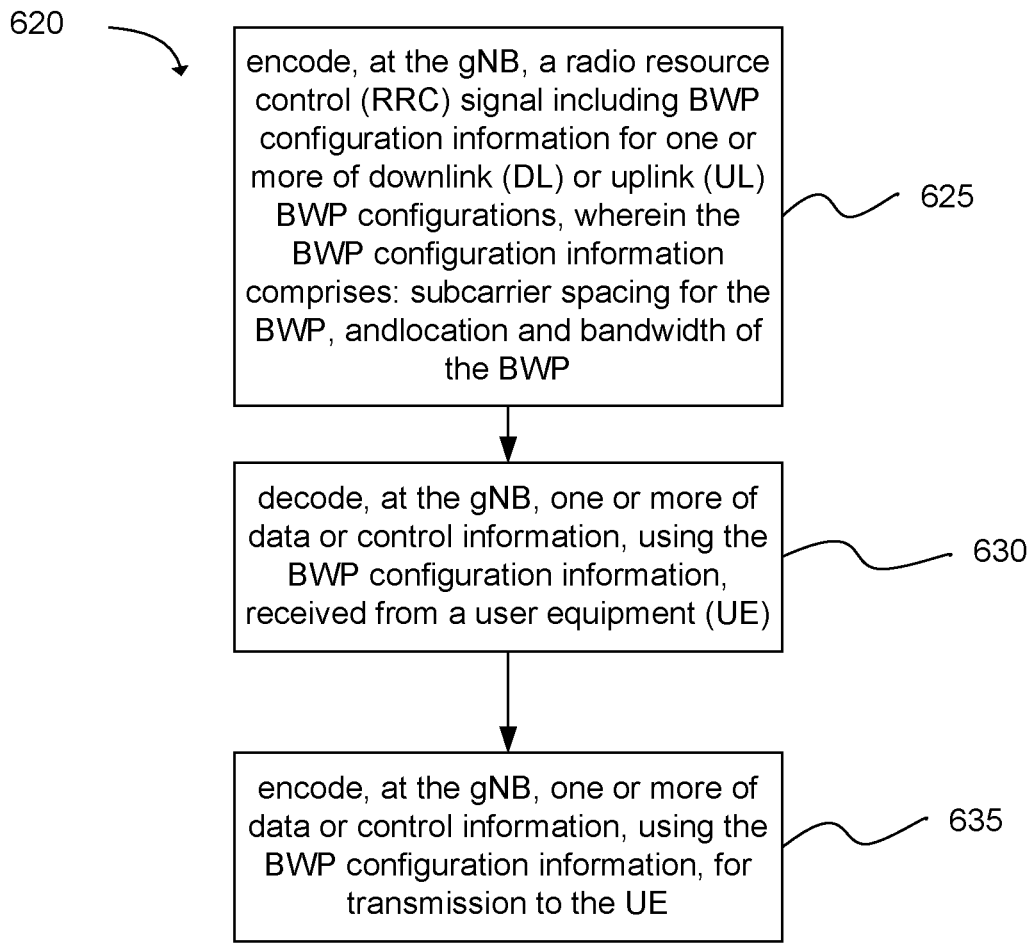
FIG. 6b depicts functionality of a next generation node B (gNB) operable for bandwidth part (BWP) configuration in accordance with an example.

Another example provides functionality 620 of a next generation node B (gNB) operable for bandwidth part (BWP) configuration, as shown in FIG. 6b. The gNB can comprise one or more processors. The one or more processors can be configured to encode, at the gNB, a radio resource control (RRC) signal including BWP configuration information for one or more of downlink (DL) or uplink (UL) BWP configurations, wherein the BWP configuration information comprises: subcarrier spacing for the BWP, and location and bandwidth of the BWP, as in block 625. The one or more processors can be configured to decode, at the gNB, one or more of data or control information, using the BWP configuration information, received from a user equipment (UE), as in block 630. The one or more processors can be configured to encode, at the gNB, one or more of data or control information, using the BWP configuration information, for transmission to the UE, as in block 635. In addition, the gNB can comprise a memory interface configured to send the BWP configuration information to a memory.

Figure 6C:
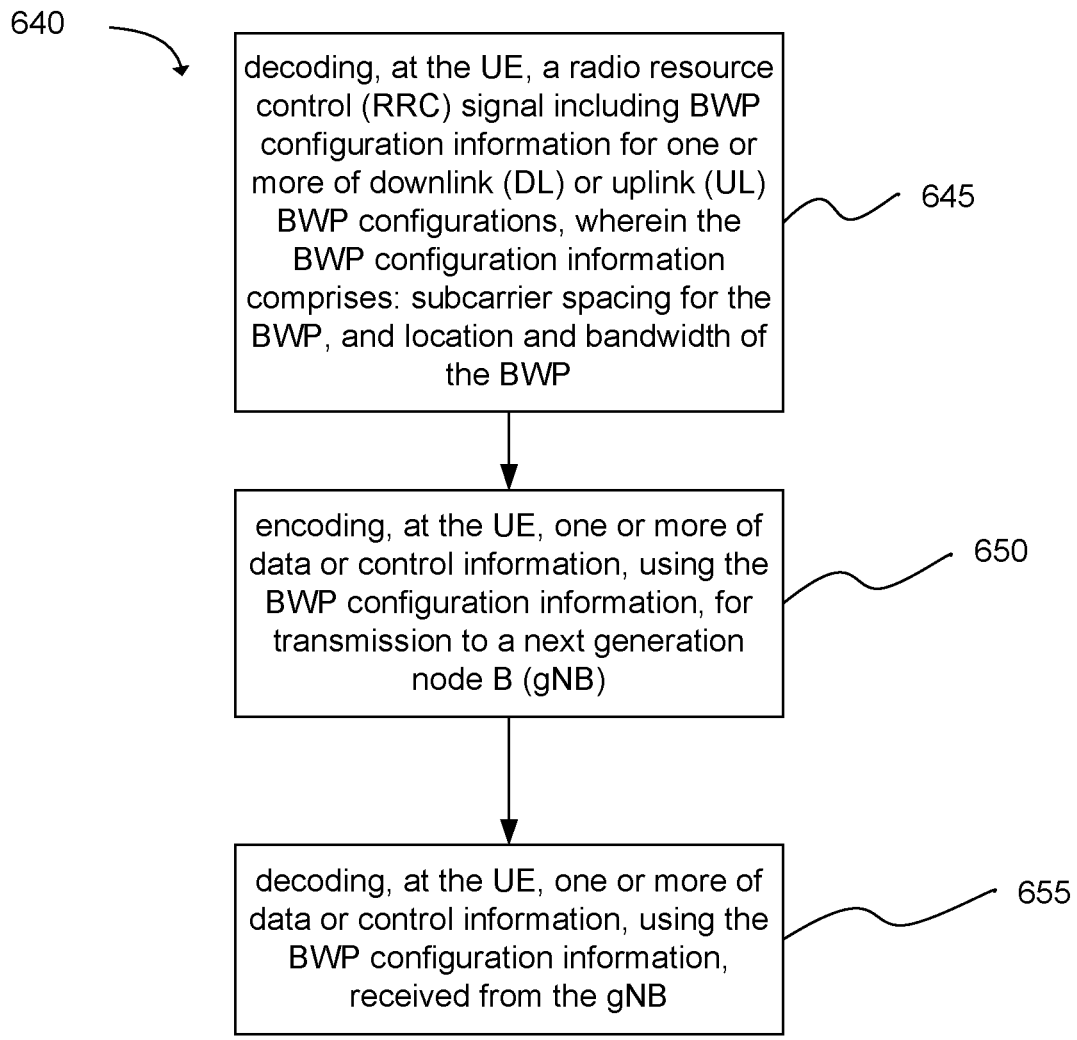
FIG. 6c depicts a flowchart of a machine readable storage medium having instructions embodied thereon for performing bandwidth part (BWP) configuration in accordance with an example.

Another example provides at least one machine readable storage medium having instructions 640 embodied thereon for performing bandwidth part (BWP) configuration, as shown in FIG. 6c. The instructions can be executed on a machine, where the instructions are included on at least one computer readable medium or one non-transitory machine readable storage medium. The instructions when executed perform: decoding, at the UE, a radio resource control (RRC) signal including BWP configuration information for one or more of downlink (DL) or uplink (UL) BWP configurations, wherein the BWP configuration information comprises: subcarrier spacing for the BWP, and location and bandwidth of the BW, as in block 645. The instructions when executed perform: encoding, at the UE, one or more of data or control information, using the BWP configuration information, for transmission to a next generation node B (gNB), as in block 650. The instructions when executed perform: decoding, at the UE, one or more of data or control information, using the BWP configuration information, received from the gNB, as in block 655.

Figure 7A:
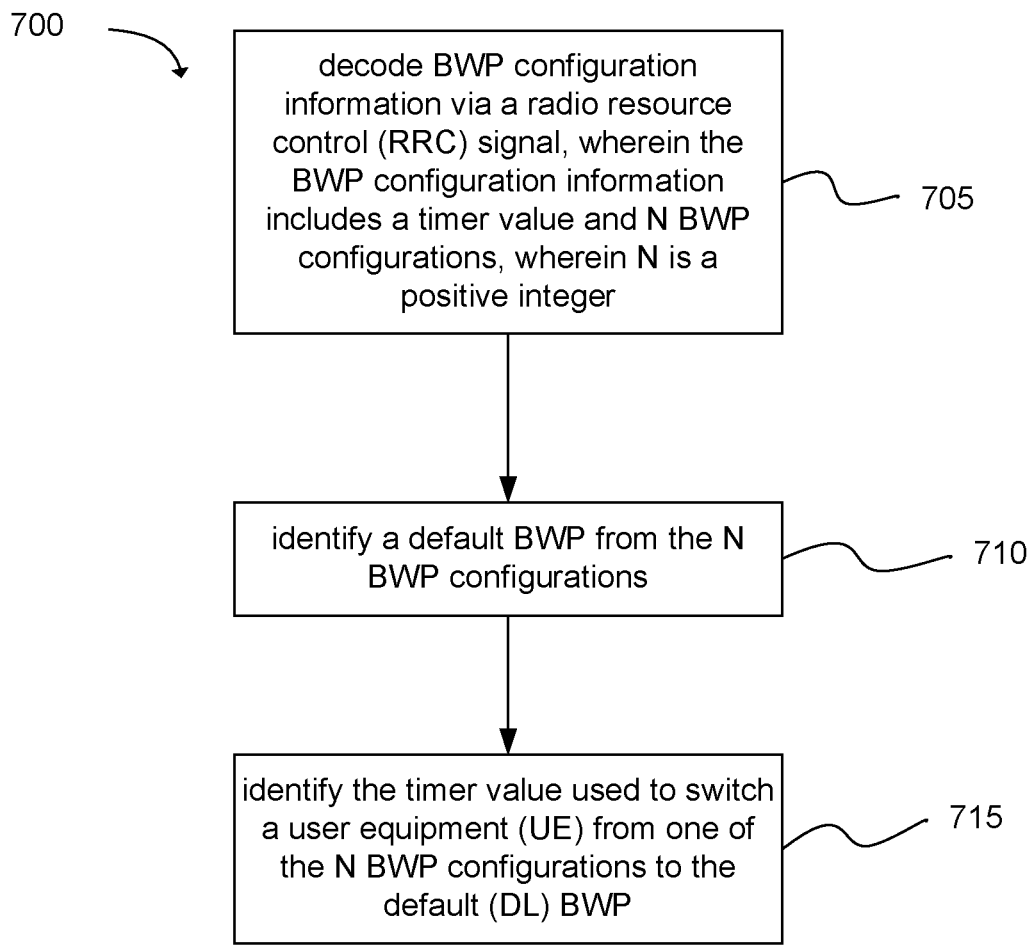
FIG. 7a depicts functionality of user equipment (UE) operable for bandwidth part (BWP) switching in accordance with an example.

Another example provides functionality 700 of a user equipment (UE) operable for bandwidth part (BWP) switching, as shown in FIG. 7a. The UE can comprise one or more processors. The one or more processors can be configured to decode BWP configuration information via a radio resource control (RRC) signal, wherein the BWP configuration information includes a timer value and N BWP configurations, wherein N is a positive integer, as in block 705. The one or more processors can be configured to identify a default BWP from the N BWP configurations, as in block 710. The one or more processors can be configured to identify the timer value used to switch a user equipment (UE) from one of the N BWP configurations to the default (DL) BWP, as in block 715. In addition, the UE can comprise a memory interface configured to send the BWP configuration information to a memory.

Figure 7B:
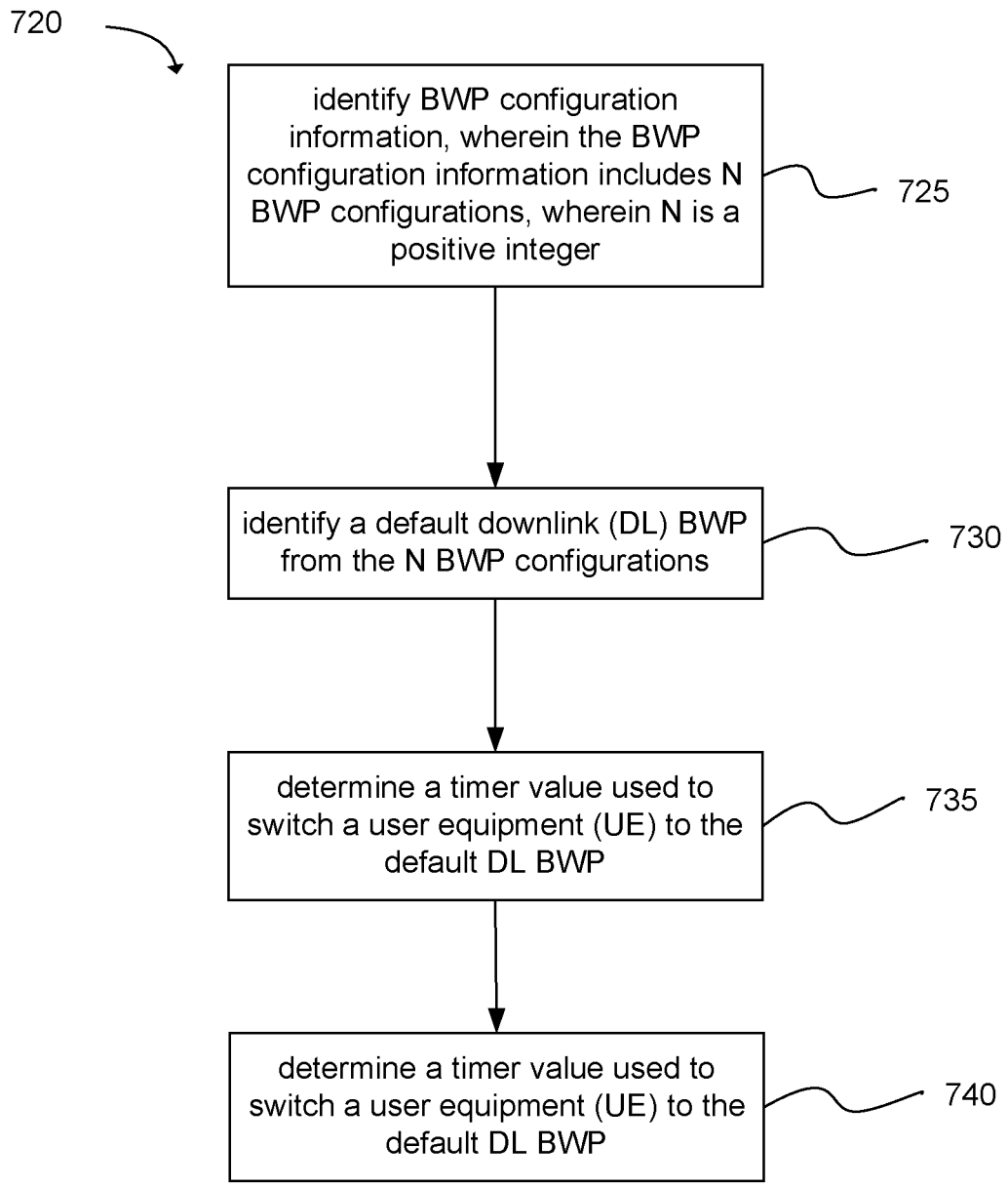
FIG. 7b depicts functionality of a next generation node B (gNB) operable for bandwidth part (BWP) switching in accordance with an example.

Another example provides functionality 720 of a next generation node B (gNB) operable for bandwidth part (BWP) switching, as shown in FIG. 7b. The gNB can comprise one or more processors. The one or more processors can be configured to identify BWP configuration information, wherein the BWP configuration information includes N BWP configurations, wherein N is a positive integer, as in block 725. The one or more processors can be configured to identify a default downlink (DL) BWP from the N BWP configurations, as in block 730. The one or more processors can be configured to determine a timer value used to switch a user equipment (UE) to the default DL BWP, as in block 735. The one or more processors can be configured to encode a radio resource control (RRC) signal including BWP configuration information for the N BWP configurations, wherein the configuration information includes the default DL BWP and the timer value for the UE to switch to the default BWP, as in block 740. In addition, the gNB can comprise a memory interface configured to send the BWP configuration information to a memory.

Figure 7C:
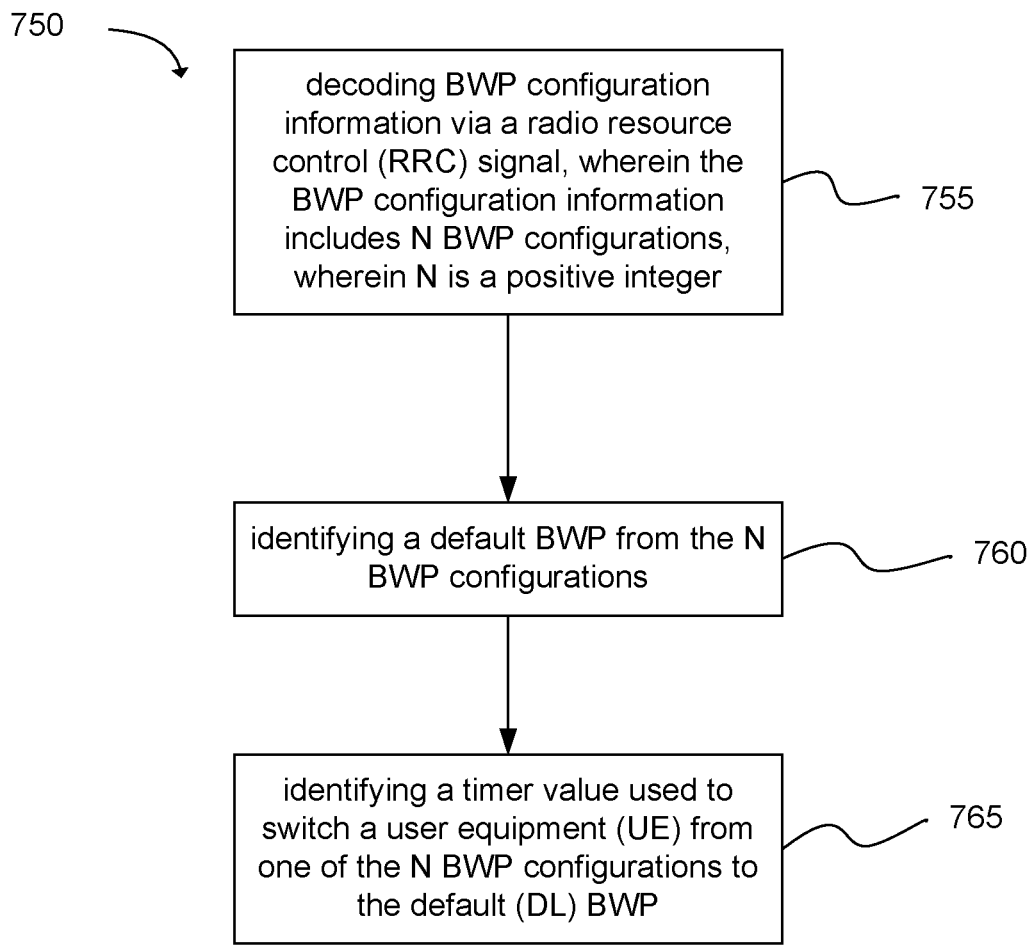
FIG. 7c depicts a flowchart of a machine readable storage medium having instructions embodied thereon for performing bandwidth part (BWP) switching in accordance with an example.

Another example provides at least one machine readable storage medium having instructions 750 embodied thereon for performing bandwidth part (BWP) switching, as shown in FIG. 7c. The instructions can be executed on a machine, where the instructions are included on at least one computer readable medium or one non-transitory machine readable storage medium. The instructions when executed perform: decoding BWP configuration information via a radio resource control (RRC) signal, wherein the BWP configuration information includes N BWP configurations, wherein N is a positive integer, as in block 755. The instructions when executed perform: identifying a default BWP from the N BWP configurations, as in block 760. The instructions when executed perform: identifying a timer value used to switch a user equipment (UE) from one of the N BWP configurations to the default (DL) BWP, as in block 765.

Figure 8A:
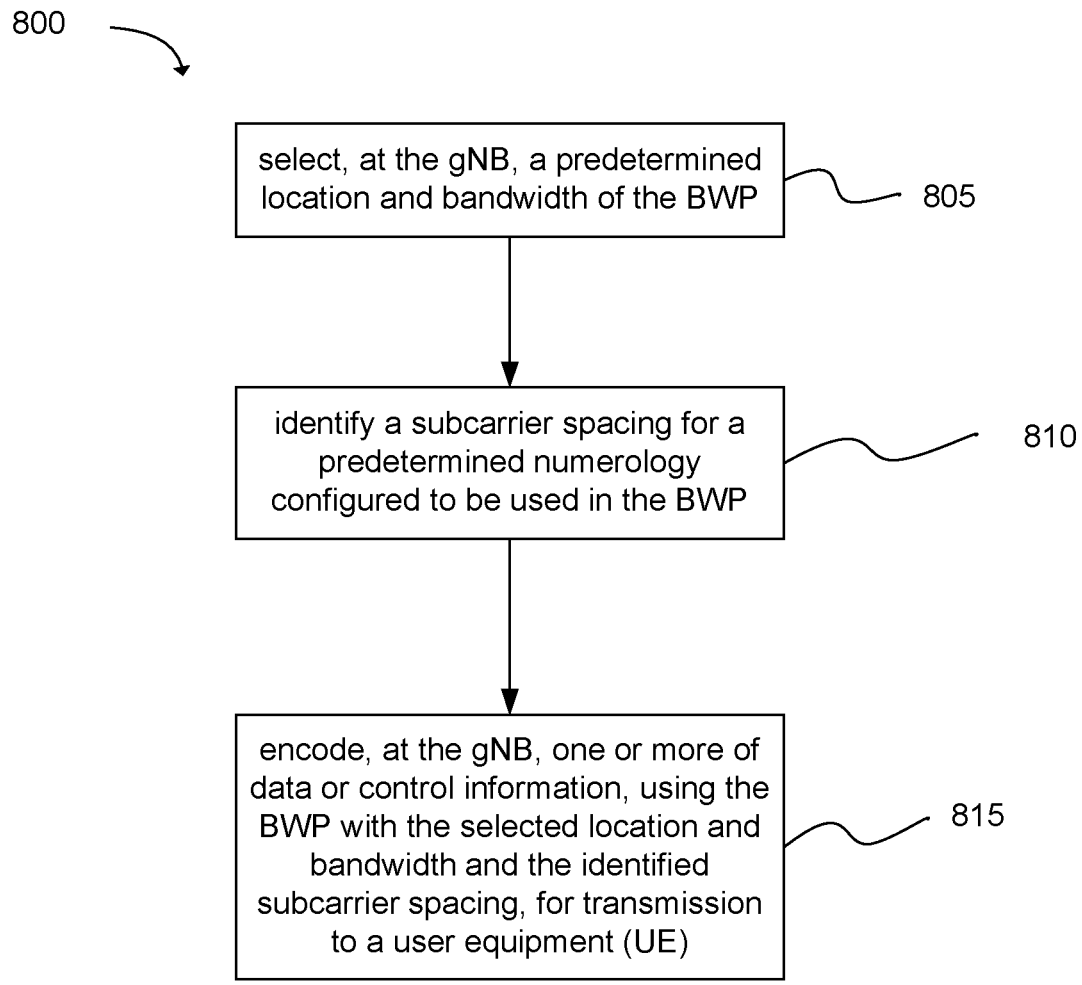
FIG. 8a depicts functionality of a next generation node B (gNB) operable for bandwidth part (BWP) operation in accordance with an example.

Another example provides functionality 800 of a next generation node B (gNB) operable for bandwidth part (BWP) operation, as shown in FIG. 8a. The gNB can comprise one or more processors. The one or more processors can be configured to select, at the gNB, a predetermined location and bandwidth of the BWP, as in block 805. The one or more processors can be configured to identify a subcarrier spacing for a predetermined numerology configured to be used in the BWP, as in block 810. The one or more processors can be configured to encode, at the gNB, one or more of data or control information, using the BWP with the selected location and bandwidth and the identified subcarrier spacing, for transmission to a user equipment (UE), as in block 815. In addition, the gNB can comprise a memory interface configured to send the subcarrier spacing to a memory.

Figure 8B:
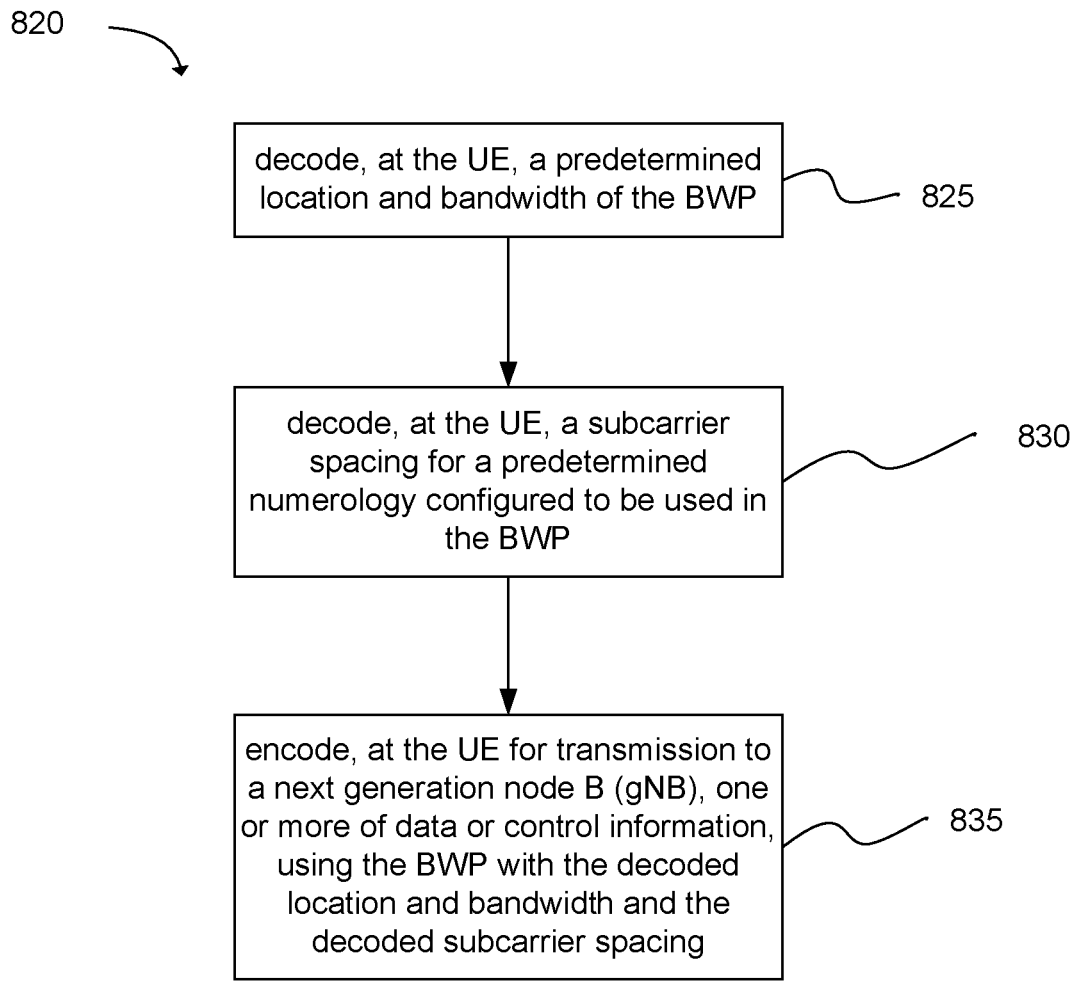
FIG. 8b depicts functionality of a user equipment (UE) operable for bandwidth part (BWP) operation in accordance with an example.

Another example provides functionality 820 of a user equipment (UE) operable for bandwidth part (BWP) operation, as shown in FIG. 8b. The UE can comprise one or more processors. The one or more processors can be configured to decode, at the UE, a predetermined location and bandwidth of the BWP, as in block 825. The one or more processors can be configured to decode, at the UE, a subcarrier spacing for a predetermined numerology configured to be used in the BWP, as in block 830. The one or more processors can be configured to encode, at the UE for transmission to a next generation node B (gNB), one or more of data or control information, using the BWP with the decoded location and bandwidth and the decoded subcarrier spacing, as in block 835. In addition, the UE can comprise a memory interface configured to send the subcarrier spacing to a memory.

Figure 8C:
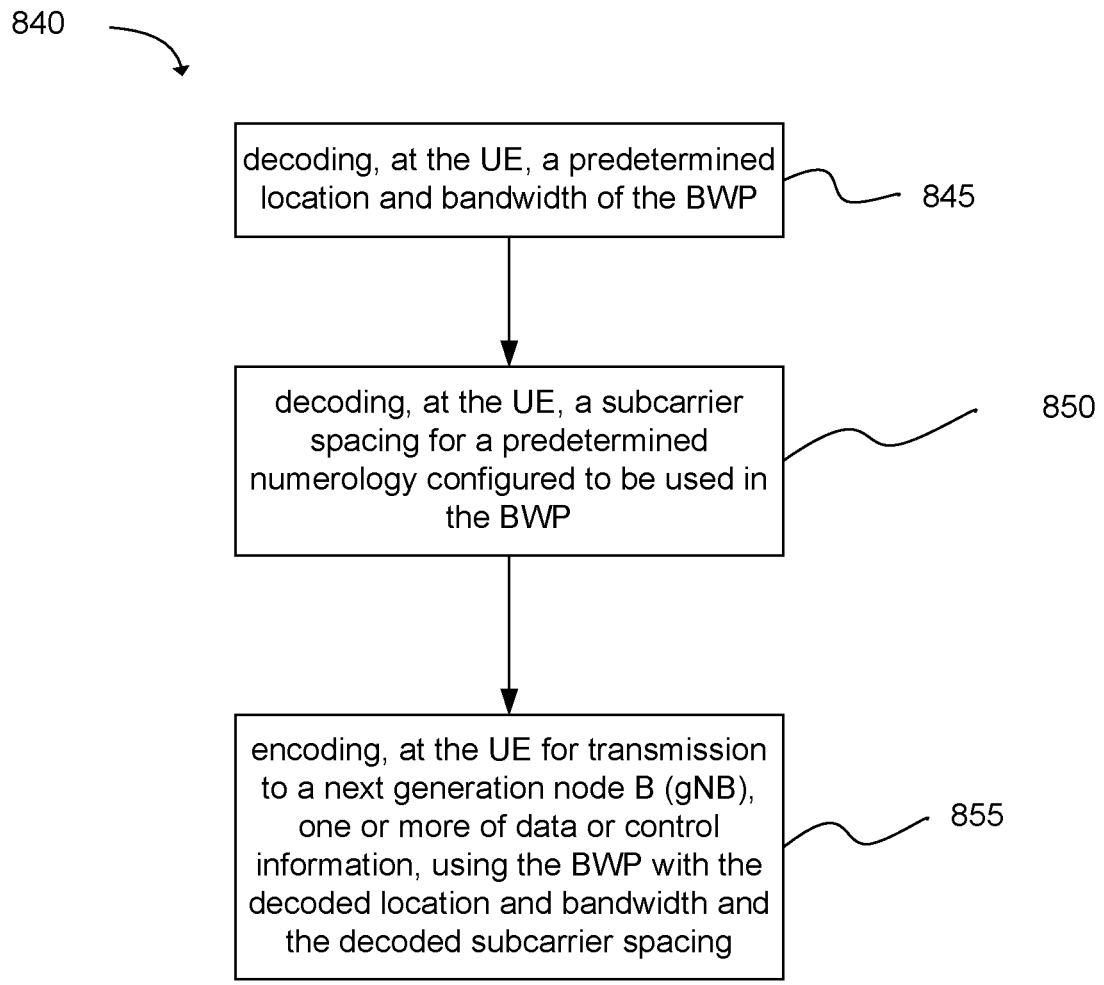
FIG. 8c depicts a flowchart of a machine readable storage medium having instructions embodied thereon for performing bandwidth part (BWP) operation in accordance with an example.

Another example provides at least one machine readable storage medium having instructions 840 embodied thereon for performing bandwidth part (BWP) operation, as shown in FIG. 8c. The instructions can be executed on a machine, where the instructions are included on at least one computer readable medium or one non-transitory machine readable storage medium. The instructions when executed perform: decoding, at the UE, a predetermined location and bandwidth of the BWP, as in block 845. The instructions when executed perform: decoding, at the UE, a subcarrier spacing for a predetermined numerology configured to be used in the BWP, as in block 850. The instructions when executed perform: encoding, at the UE for transmission to a next generation node B (gNB), one or more of data or control information, using the BWP with the decoded location and bandwidth and the decoded subcarrier spacing, as in block 855.

While examples have been provided in which a gNB has been specified, they are not intended to be limiting. An evolved node B (eNodeB) can be used in place of the gNB. Accordingly, unless otherwise stated, any example herein in which a gNB has been disclosed, can similarly be disclosed with the use of an eNodeB.

Figure 9:
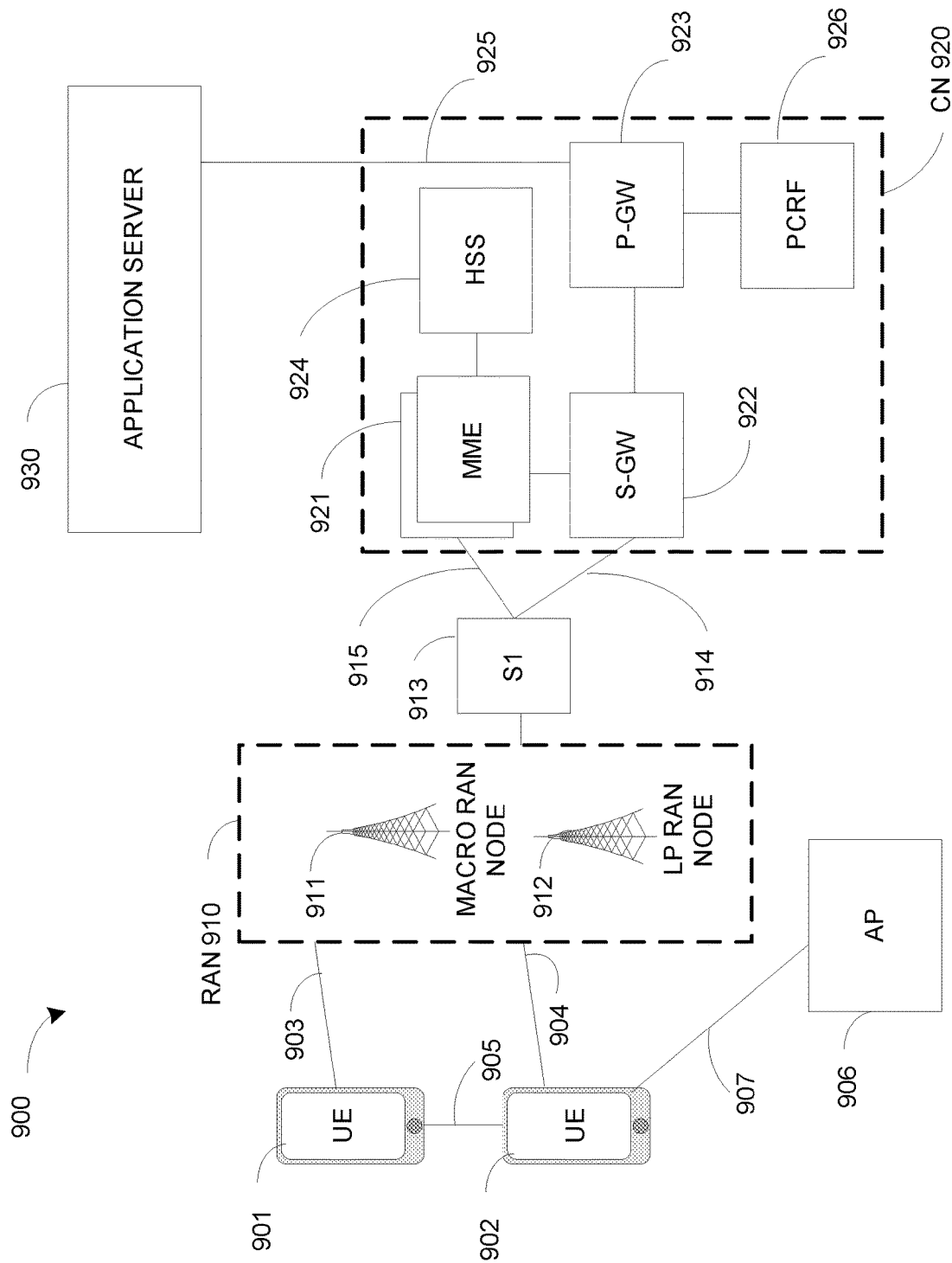
FIG. 9 illustrates an architecture of a wireless network in accordance with an example.

FIG. 9 illustrates an architecture of a system 900 of a network in accordance with some embodiments. The system 900 is shown to include a user equipment (UE) 901 and a UE 902. The UEs 901 and 902 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 901 and 902 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 and 902 may be configured to connect, e.g., communicatively couple, with a radio access network (RAN) 910—the RAN 910 may be, for example, an Evolved Universal Mobile Telecommunications System (UMTS) Terrestrial Radio Access Network (E-UTRAN), a NextGen RAN (NG RAN), or some other type of RAN. The UEs 901 and 902 utilize connections 903 and 904, respectively, each of which comprises a physical communications interface or layer (discussed in further detail below); in this example, the connections 903 and 904 are illustrated as an air interface to enable communicative coupling, and can be consistent with cellular communications protocols, such as a Global System for Mobile Communications (GSM) protocol, a code-division multiple access (CDMA) network protocol, a Push-to- Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 901 and 902 may further directly exchange communication data via a ProSe interface 905. The ProSe interface 905 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 902 is shown to be configured to access an access point (AP) 906 via connection 907. The connection 907 can comprise a local wireless connection, such as a connection consistent with any IEEE 802.15 protocol, wherein the AP 906 would comprise a wireless fidelity (WiFi®) router. In this example, the AP 906 is shown to be connected to the Internet without connecting to the core network of the wireless system (described in further detail below).

The RAN 910 can include one or more access nodes that enable the connections 903 and 904. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 910 may include one or more RAN nodes for providing macrocells, e.g., macro RAN node 911, and one or more RAN nodes for providing femtocells or picocells (e.g., cells having smaller coverage areas, smaller user capacity, or higher bandwidth compared to macrocells), e.g., low power (LP) RAN node 912.

Any of the RAN nodes 911 and 912 can terminate the air interface protocol and can be the first point of contact for the UEs 901 and 902. In some embodiments, any of the RAN nodes 911 and 912 can fulfill various logical functions for the RAN 910 including, but not limited to, radio network controller (RNC) functions such as radio bearer management, uplink and downlink dynamic radio resource management and data packet scheduling, and mobility management.

In accordance with some embodiments, the UEs 901 and 902 can be configured to communicate using Orthogonal Frequency-Division Multiplexing (OFDM) communication signals with each other or with any of the RAN nodes 911 and 912 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 911 and 912 to the UEs 901 and 902, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 901 and 902. The physical downlink control channel (PDCCH) may carry information about the transport format and resource allocations related to the PDSCH channel, among other things. It may also inform the UEs 901 and 902 about the transport format, resource allocation, and H-ARQ (Hybrid Automatic Repeat Request) information related to the uplink shared channel. Typically, downlink scheduling (assigning control and shared channel resource blocks to the UE 902 within a cell) may be performed at any of the RAN nodes 911 and 912 based on channel quality information fed back from any of the UEs 901 and 902. The downlink resource assignment information may be sent on the PDCCH used for (e.g., assigned to) each of the UEs 901 and 902.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 910 is shown to be communicatively coupled to a core network (CN) 920—via an S1 interface 913. In embodiments, the CN 920 may be an evolved packet core (EPC) network, a NextGen Packet Core (NPC) network, or some other type of CN. In this embodiment the S1 interface 913 is split into two parts: the S1-U interface 914, which carries traffic data between the RAN nodes 911 and 912 and the serving gateway (S-GW) 922, and the S1-mobility management entity (MME) interface 915, which is a signaling interface between the RAN nodes 911 and 912 and MMEs 921.

In this embodiment, the CN 920 comprises the MMEs 921, the S-GW 922, the Packet Data Network (PDN) Gateway (P-GW) 923, and a home subscriber server (HSS) 924. The MMEs 921 may be similar in function to the control plane of legacy Serving General Packet Radio Service (GPRS) Support Nodes (SGSN). The MMEs 921 may manage mobility aspects in access such as gateway selection and tracking area list management. The HSS 924 may comprise a database for network users, including subscription-related information to support the network entities' handling of communication sessions. The CN 920 may comprise one or several HSSs 924, depending on the number of mobile subscribers, on the capacity of the equipment, on the organization of the network, etc. For example, the HSS 924 can provide support for routing/roaming, authentication, authorization, naming/addressing resolution, location dependencies, etc.

The S-GW 922 may terminate the S1 interface 913 towards the RAN 910, and routes data packets between the RAN 910 and the CN 920. In addition, the S-GW 922 may be a local mobility anchor point for inter-RAN node handovers and also may provide an anchor for inter-3GPP mobility. Other responsibilities may include lawful intercept, charging, and some policy enforcement.

The P-GW 923 may terminate an SGi interface toward a PDN. The P-GW 923 may route data packets between the EPC network 923 and external networks such as a network including the application server 930 (alternatively referred to as application function (AF)) via an Internet Protocol (IP) interface 925. Generally, the application server 930 may be an element offering applications that use IP bearer resources with the core network (e.g., UMTS Packet Services (PS) domain, LTE PS data services, etc.). In this embodiment, the P-GW 923 is shown to be communicatively coupled to an application server 930 via an IP communications interface 925. The application server 930 can also be configured to support one or more communication services (e.g., Voice-over-Internet Protocol (VoIP) sessions, PTT sessions, group communication sessions, social networking services, etc.) for the UEs 901 and 902 via the CN 920.

The P-GW 923 may further be a node for policy enforcement and charging data collection. Policy and Charging Enforcement Function (PCRF) 926 is the policy and charging control element of the CN 920. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 926 may be communicatively coupled to the application server 930 via the P-GW 923. The application server 930 may signal the PCRF 926 to indicate a new service flow and select the appropriate Quality of Service (QoS) and charging parameters. The PCRF 926 may provision this rule into a Policy and Charging Enforcement Function (PCEF) (not shown) with the appropriate traffic flow template (TFT) and QoS class of identifier (QCI), which commences the QoS and charging as specified by the application server 930.

Figure 10:
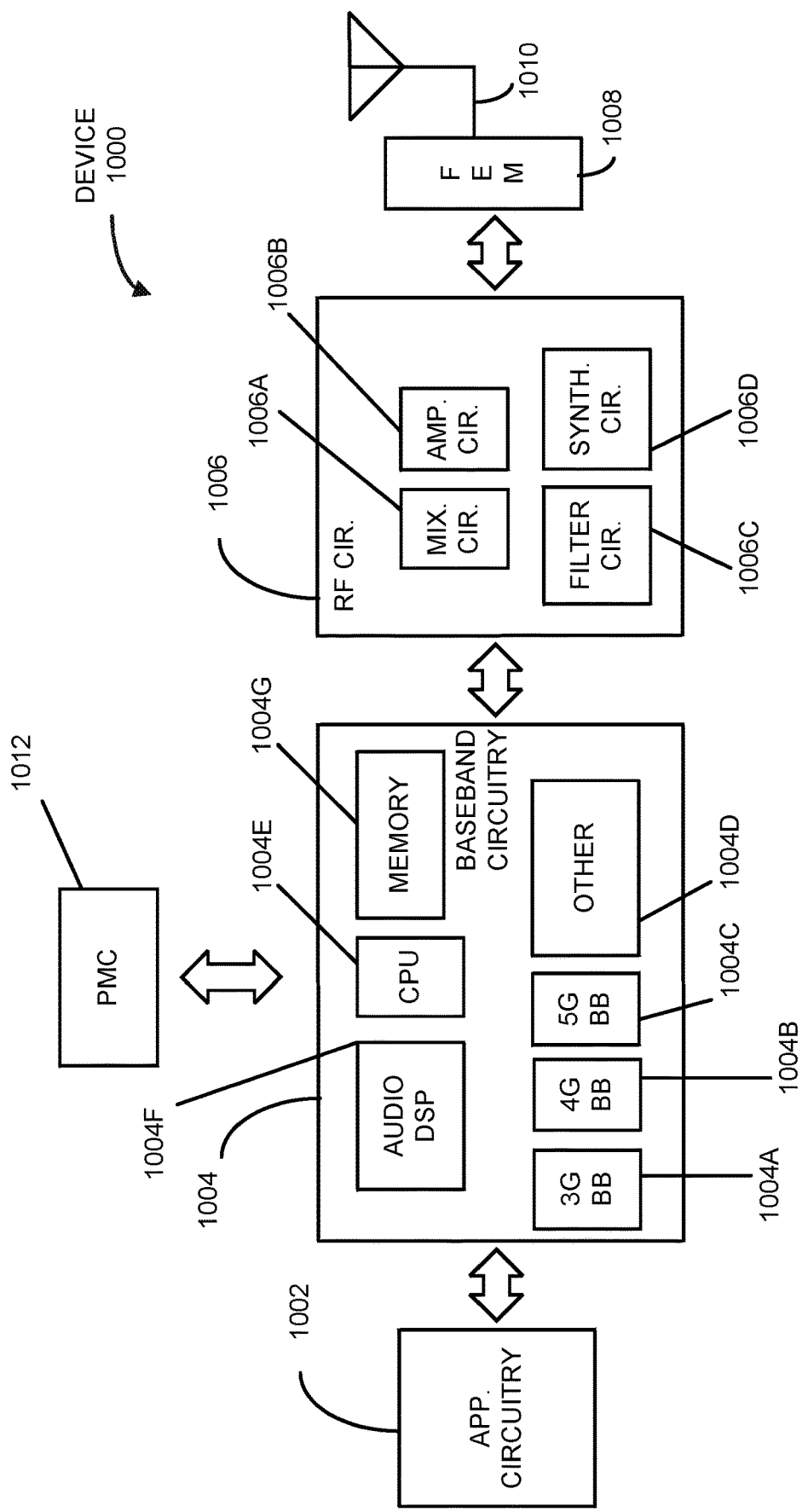
FIG. 10 illustrates a diagram of a wireless device (e.g., UE) in accordance with an example.

FIG. 10 illustrates example components of a device 1000 in accordance with some embodiments. In some embodiments, the device 1000 may include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 may be included in a UE or a RAN node. In some embodiments, the device 1000 may include less elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a third generation (3G) baseband processor 1004a, a fourth generation (4G) baseband processor 1004b, a fifth generation (5G) baseband processor 1004c, or other baseband processor(s) 1004d for other existing generations, generations in development or to be developed in the future (e.g., second generation (2G), sixth generation (6G), etc.). The baseband circuitry 1004 (e.g., one or more of baseband processors 1004a-d) may handle various radio control functions that enable communication with one or more radio networks via the RF circuitry 1006. In other embodiments, some or all of the functionality of baseband processors 1004a-d may be included in modules stored in the memory 1004g and executed via a Central Processing Unit (CPU) 1004e. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004f. The audio DSP(s) 1004f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the receive signal path of the RF circuitry 1006 may include mixer circuitry 1006a, amplifier circuitry 1006b and filter circuitry 1006c. In some embodiments, the transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a necessity. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c.

In some embodiments, the mixer circuitry 1006a of the receive signal path and the mixer circuitry 1006a of the transmit signal path may include two or more mixers and may be arranged for quadrature downconversion and upconversion, respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a necessity. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency)

and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the PMC 1012 may manage power provided to the baseband circuitry 1004. In particular, the PMC 1012 may control power-source selection, voltage scaling, battery charging, or DC-to-DC conversion. The PMC 1012 may often be included when the device 1000 is capable of being powered by a battery, for example, when the device is included in a UE. The PMC 1012 may increase the power conversion efficiency while providing desirable implementation size and heat dissipation characteristics.

While FIG. 10 shows the PMC 1012 coupled only with the baseband circuitry 1004. However, in other embodiments, the PMC 1012 may be additionally or alternatively coupled with, and perform similar power management operations for, other components such as, but not limited to, application circuitry 1002, RF circuitry 1006, or FEM 1008.

In some embodiments, the PMC 1012 may control, or otherwise be part of, various power saving mechanisms of the device 1000. For example, if the device 1000 is in an RRC Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, in order to receive data, it can transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used execute Layer 3, Layer 2, or Layer 1 functionality, while processors of the application circuitry 1004 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
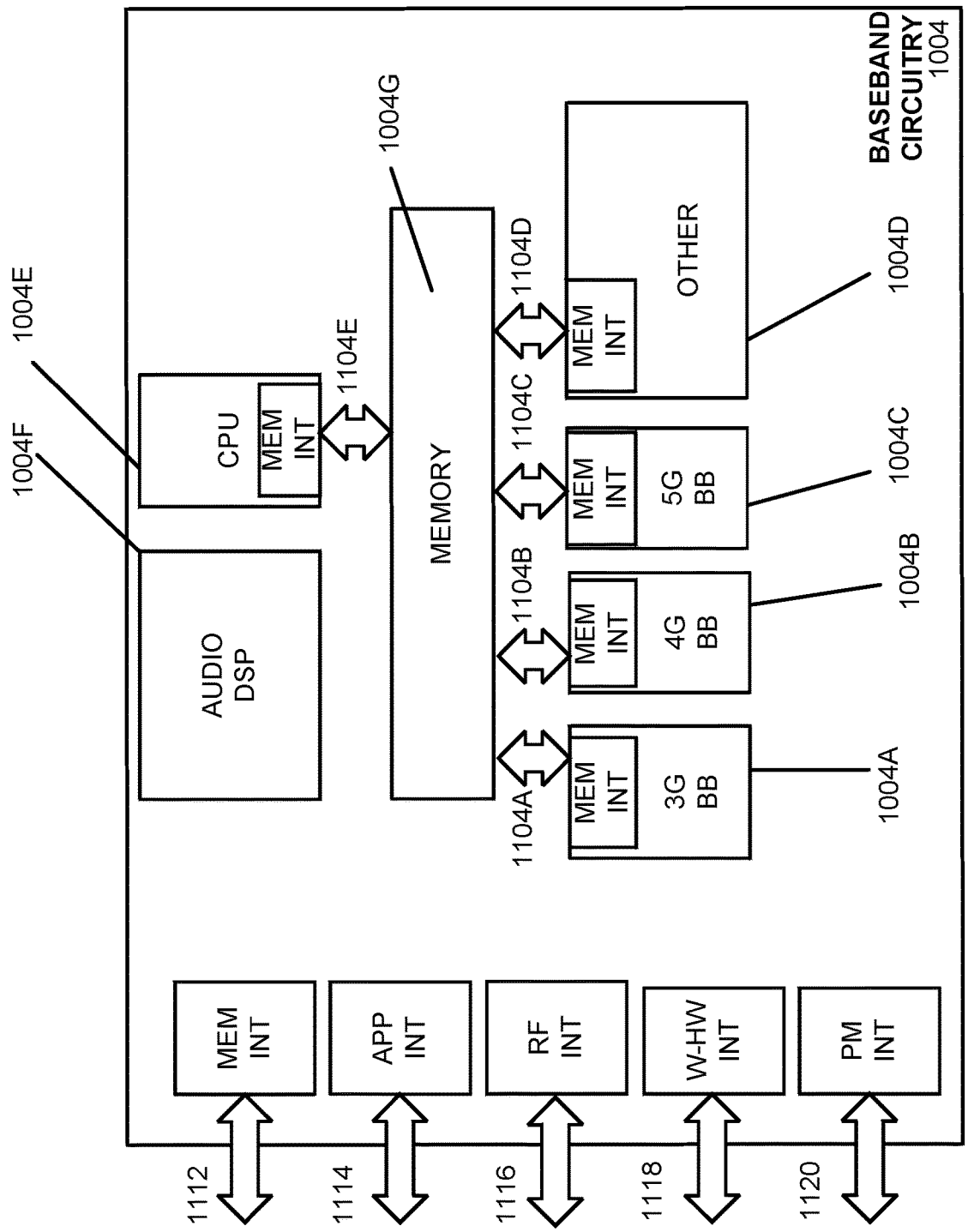
FIG. 11 illustrates interfaces of baseband circuitry in accordance with an example.

FIG. 11 illustrates example interfaces of baseband circuitry in accordance with some embodiments. As discussed above, the baseband circuitry 1004 of FIG. 10 may comprise processors 1004a-1004e and a memory 1004g utilized by said processors. Each of the processors 1004a-1004e may include a memory interface, 1104a-1104e, respectively, to send/receive data to/from the memory 1004g.

The baseband circuitry 1004 may further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1012.

Figure 12:
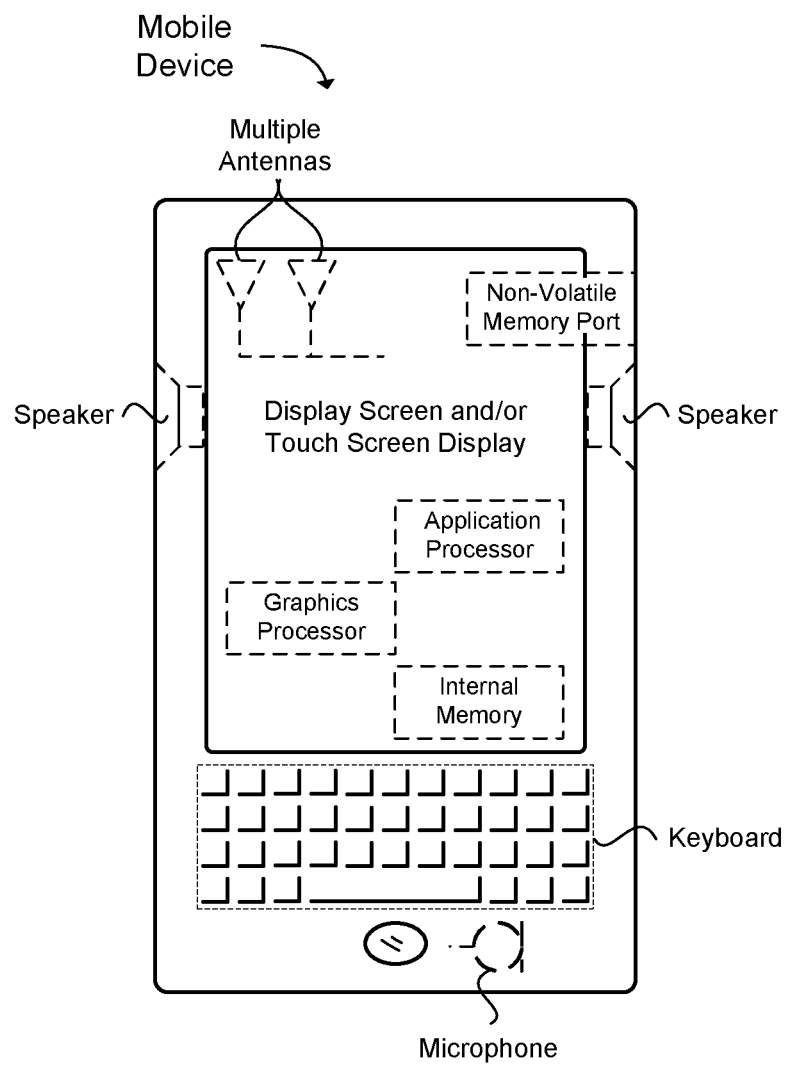
FIG. 12 illustrates a diagram of a wireless device (e.g., UE) in accordance with an example.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 12 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable for bandwidth part (BWP) configuration, the apparatus comprising: one or more processors configured to: decode, at the UE, a radio resource control (RRC) signal including BWP configuration information for one or more of downlink (DL) or uplink (UL) BWP configurations, wherein the BWP configuration information comprises: subcarrier spacing for the BWP, and location and bandwidth of the BWP; encode, at the UE, one or more of data or control information, using the BWP configuration information, for transmission to a next generation node B (gNB); and decode, at the UE, one or more of data or control information, using the BWP configuration information, received from the gNB; and a memory interface configured to send the BWP configuration information to a memory.

Example 2 includes the apparatus of Example 1, wherein the one or more processors are further configured to: decode, at the UE, the RRC signal including the BWP configuration information, wherein the BWP configuration information includes N BWP configurations, wherein N is a positive integer.

Example 3 includes the apparatus of Example 2, wherein for the N BWP configurations there is one active DL BWP and one active UL BWP.

Example 4 includes the apparatus of Example 2, wherein N is a maximum number of DL BWP configurations and a maximum number of UL BWP configurations.

Example 5 includes the apparatus of Example 4, wherein N is 4.

Example 6 includes the apparatus of Example 2, wherein the one or more processors are further configured to: decode, at the UE, the RRC signal including the location and the bandwidth of the BWP, wherein the location and the bandwidth is comprised of a number of physical resource blocks (PRBs) relative to an absolute frequency location.

Example 7 includes the apparatus of any of Examples 1 to 4, wherein the one or more processors are further configured to: decode, at the UE, the RRC signal, wherein the RRC signal comprises a cyclic prefix (CP).

Example 8 includes the apparatus of any of Examples 1 to 4, wherein the one or more processors are further configured to: decode, at the UE, the RRC signal including the BWP configuration information for one or more of the DL or the UL BWP configurations, wherein the one or more DL BWP configurations are configured separately from the one or more UL BWP configurations.

Example 9 includes the apparatus of Example 2, wherein for the N BWP configurations, the frequency range of a BWP configuration overlaps with the frequency range of another BWP configuration.

Example 10 includes an apparatus of a next generation node B (gNB) operable for bandwidth part (BWP) configuration, the apparatus comprising: one or more processors configured to: encode, at the gNB, a radio resource control (RRC) signal including BWP configuration information for one or more of downlink (DL) or uplink (UL) BWP configurations, wherein the BWP configuration information comprises: subcarrier spacing for the BWP, and location and bandwidth of the BWP; decode, at the gNB, one or more of data or control information, using the BWP configuration information, received from a user equipment (UE); and encode, at the gNB, one or more of data or control information, using the BWP configuration information, for transmission to the UE; and a memory interface configured to send the BWP configuration information to a memory.

Example 11 includes the apparatus of Example 10, wherein the one or more processors are further configured to: encode, at the gNB, the RRC signal including the BWP configuration information, wherein the BWP configuration information includes N BWP configurations, wherein N is a positive integer.

Example 12 includes the apparatus of Example 11, wherein for the N BWP configurations there is one active DL BWP and one active UL BWP.

Example 13 includes the apparatus of Example 11, wherein N is a maximum number of DL BWP configurations and a maximum number of UL BWP configurations.

Example 14 includes the apparatus of Example 13, wherein N is 4.

Example 15 includes the apparatus of Example 10, wherein the one or more processors are further configured to: encode, at the gNB, the RRC signal including the location and the bandwidth of the BWP, wherein the location and the bandwidth is comprised of a number of physical resource blocks (PRBs) relative to an absolute frequency location.

Example 16 includes the apparatus of any of Examples 10 to 15, wherein the one or more processors are further configured to: encode, at the gNB, the RRC signal, wherein the RRC signal comprises a cyclic prefix (CP).

Example 17 includes the apparatus of any of Examples 10 to 15, wherein the one or more processors are further configured to: encode, at the gNB, the RRC signal including the BWP configuration information for one or more of the DL or the UL BWP configurations, wherein the one or more DL BWP configurations are configured separately from the one or more UL BWP configurations.

Example 18 includes at least one machine readable storage medium having instructions embodied thereon for performing bandwidth part (BWP) configuration, the instructions when executed by one or more processors at a UE perform the following: decoding, at the UE, a radio resource control (RRC) signal including BWP configuration information for one or more of downlink (DL) or uplink (UL) BWP configurations, wherein the BWP configuration information comprises: subcarrier spacing for the BWP, and location and bandwidth of the BWP, and encoding, at the UE, one or more of data or control information, using the BWP configuration information, for transmission to a next generation node B (gNB); and decoding, at the UE, one or more of data or control information, using the BWP configuration information, received from the gNB.

Example 19 includes the at least one machine readable storage medium of Example 18, further comprising instructions that when executed perform: decoding, at the UE, the RRC signal including the BWP configuration information, wherein the BWP configuration information includes N BWP configurations, wherein N is a positive integer.

Example 20 includes the at least one machine readable storage medium of Example 19, wherein for the N BWP configurations there is one active DL BWP and one active UL BWP.

Example 21 includes the at least one machine readable storage medium of Example 19, wherein N is a maximum number of DL BWP configurations and a maximum number of UL BWP configurations.

Example 22 includes the apparatus of Example 21, wherein N is 4.

Example 23 includes the at least one machine readable storage medium of any of Examples 18 to 21, further comprising instructions that when executed perform: decoding, at the UE, the RRC signal, wherein the RRC signal comprises a cyclic prefix (CP).

Example 24 includes the at least one machine readable storage medium of any of Examples 18 to 21, further comprising instructions that when executed perform: decoding, at the UE, the RRC signal including the BWP configuration information for one or more of the DL or the UL BWP configurations, wherein the one or more DL BWP configurations are configured separately from the one or more UL BWP configurations.

Example 25 includes an apparatus of a user equipment (UE) operable for bandwidth part (BWP) switching, the apparatus comprising: one or more processors configured to: decode BWP configuration information via a radio resource control (RRC) signal, wherein the BWP configuration information includes a timer value and N BWP configurations, wherein N is a positive integer; identify a default BWP from the N BWP configurations; and identify the timer value used to switch a user equipment (UE) from one of the N BWP configurations to the default (DL) BWP; and a memory interface configured to send the configuration information to a memory.

Example 26 includes the apparatus of Example 25, further comprising a transceiver configured to: receive the configuration information via the RRC signal.

Example 27 includes the apparatus of Example 25, wherein the one or more processors are further configured to: start the switching timer, at the UE, when the UE switches to an active DL BWP that is not the default DL BWP.

Example 28 includes the apparatus of Example 25, wherein the one or more processors are further configured to: switch an active DL BWP to a default DL BWP upon expiration of the switching timer.

Example 29 includes the apparatus of Example 27, wherein the one or more processors are further configured to: restart the switching timer, at the UE, when the UE successfully control information.

Example 30 includes the apparatus of Example 29, wherein the control information comprises downlink control information (DCI) used to schedule physical downlink shared channel (PDSCH) in the active DL BWP.

Example 31 includes the apparatus of Example 25, wherein the one or more processors are further configured to: determine, at the UE, an active DL BWP.

Example 32 includes the apparatus of Example 25, wherein the UE includes an antenna, a touch sensitive display screen, a speaker, a microphone, a graphics processor, an application processor, an internal memory, a non-volatile memory port, or combinations thereof.

Example 33 includes an apparatus of a next generation node B (gNB) operable for bandwidth part (BWP) switching, the apparatus comprising: one or more processors configured to: identify BWP configuration information, wherein the BWP configuration information includes N BWP configurations, wherein N is a positive integer; identify a default downlink (DL) BWP from the N BWP configurations; determine a timer value used to switch a user equipment (UE) to the default DL BWP; encode a radio resource control (RRC) signal including BWP configuration information for the N BWP configurations, wherein the configuration information includes the default DL BWP and the timer value for the UE to switch to the default BWP; and a memory interface configured to send the configuration information to a memory.

Example 34 includes the apparatus of Example 33, further comprising a transceiver configured to: transmit the configuration information via the RRC signal.

Example 35 includes the apparatus of Example 33, wherein the one or more processors are further configured to: start the switching timer, at the gNB, when the gNB switches to an active DL BWP that is not the default DL BWP.

Example 36 includes the apparatus of Example 35, wherein the one or more processors are further configured to: switch from encoding data or control information for transmission in the active DL BWP to encoding the data of the control information for transmission in the default DL BWP upon expiration of the switching timer.

Example 37 includes the apparatus of Example 33, wherein the one or more processors are further configured to: determine, at the gNB, an active DL BWP.

Example 38 includes at least one machine readable storage medium having instructions embodied thereon for performing bandwidth part (BWP) switching, the instructions when executed by one or more processors at a user equipment (UE) perform the following: decoding BWP configuration information via a radio resource control (RRC) signal, wherein the BWP configuration information includes N BWP configurations, wherein N is a positive integer; identifying a default BWP from the N BWP configurations; and identifying a timer value used to switch a user equipment (UE) from one of the N BWP configurations to the default (DL) BWP.

Example 39 includes the at least one machine readable storage medium of Example 38, further comprising instructions that when executed perform: starting the switching timer, at the UE, when the UE switches to an active DL BWP that is not the default DL BWP.

Example 40 includes the at least one machine readable storage medium of Example 39, further comprising instructions that when executed perform: switching the active DL BWP to a default DL BWP upon expiration of the switching timer.

Example 41 includes the at least one machine readable storage medium of Example 39, further comprising instructions that when executed perform: restarting the switching timer, at the UE, when the UE successfully decodes a downlink control information (DCI) to schedule physical downlink shared channel (PDSCH) in the active DL BWP.

Example 42 includes the at least one machine readable storage medium of Example 38, further comprising instructions that when executed perform: determining, at the UE, an active DL BWP.

Example 43 includes an apparatus of a next generation node B (gNB) operable for bandwidth part (BWP) operation, the apparatus comprising: one or more processors configured to: select, at the gNB, a predetermined location and bandwidth of the BWP; identify a subcarrier spacing for a predetermined numerology configured to be used in the BWP, and encode, at the gNB, one or more of data or control information, using the BWP with the selected location and bandwidth and the identified subcarrier spacing, for transmission to a user equipment (UE); and a memory interface configured to send the subcarrier spacing to a memory.

Example 44 includes the apparatus of Example 43, further comprising a transceiver configured to: receive data or control information in the BWP.

Example 45 includes the apparatus of Example 43, wherein the one or more processors are further configured to: select the location and bandwidth, wherein the location is an offset of a number of physical resource blocks (PRBs) to an absolute frequency location.

Example 46 includes the apparatus of Example 45, wherein the bandwidth is the number of physical resource blocks (PRBs).

Example 47 includes the apparatus of Example 43, wherein the one or more processors are further configured to: select a predetermined location and bandwidth and a subcarrier spacing for a plurality of BWP configurations.

Example 48 includes the apparatus of Example 47, wherein for the plurality of BWP configurations, the frequency range of a BWP configuration overlaps with a frequency range of another BWP configuration.

Example 49 includes the apparatus of Example 43, wherein the one or more processors are further configured to: select a cyclic prefix (CP) length based on the subcarrier spacing.

Example 50 includes the apparatus of Example 43, wherein the one or more processors are further configured to: encode, at the gNB, a radio resource control (RRC) signal including BWP configuration information for one or more of downlink (DL) or one or more uplink (UL) BWP configurations.

Example 51 includes the apparatus of Example 50, wherein the one or more processors are further configured to: encode, at the gNB, the RRC signal, wherein the BWP configuration information includes the location and the bandwidth of the BWP, wherein the location and the bandwidth is comprised of a number of physical resource blocks (PRBs) relative to an absolute frequency location.

Example 52 includes an apparatus of a user equipment (UE) operable for bandwidth part (BWP) operation, the apparatus comprising: one or more processors configured to: decode, at the UE, a predetermined location and bandwidth of the BWP; decode, at the UE, a subcarrier spacing for a predetermined numerology configured to be used in the BWP, and encode, at the UE for transmission to a next generation node B (gNB), one or more of data or control information, using the BWP with the decoded location and bandwidth and the decoded subcarrier spacing; and a memory interface configured to send the subcarrier spacing to a memory.

Example 53 includes the apparatus of Example 52, further comprising a transceiver configured to: transmit data or control information in the BWP.

Example 54 includes the apparatus of Example 52, wherein the one or more processors are further configured to: decode an offset of a number of physical resource blocks (PRBs) to an absolute frequency location to determine the location.

Example 55 includes the apparatus of Example 54, wherein the bandwidth is the number of physical resource blocks (PRBs).

Example 56 includes the apparatus of Example 52, wherein the one or more processors are further configured to: decode the predetermined location and the bandwidth and the subcarrier spacing for a plurality of BWPs configurations.

Example 57 includes the apparatus of Example 56, wherein for the plurality of BWP configurations, the frequency range of a BWP configuration overlaps with a frequency range of another BWP configuration.

Example 58 includes the apparatus of Example 52, wherein the one or more processors are further configured to: decode a cyclic prefix (CP) length, wherein the CP length is based on the subcarrier spacing.

Example 59 includes the apparatus of Example 52, wherein the one or more processors are further configured to: decode, at the UE, a radio resource control (RRC) signal including BWP configuration information for one or more of downlink (DL) or one or more uplink (UL) BWP configurations.

Example 60 includes the apparatus of Example 59, wherein the one or more processors are further configured to: decode, at the UE, the RRC signal, wherein the BWP configuration information includes the location and the bandwidth of the BWP, wherein the location and the bandwidth is comprised of a number of physical resource blocks (PRBs) relative to an absolute frequency location.

Example 61 includes at least one machine readable storage medium having instructions embodied thereon for performing bandwidth part (BWP) operation, the instructions when executed by one or more processors at a next generation node B (gNB) perform the following: decoding, at the UE, a predetermined location and bandwidth of the BWP; decoding, at the UE, a subcarrier spacing for a predetermined numerology configured to be used in the BWP, and encoding, at the UE for transmission to a next generation node B (gNB), one or more of data or control information, using the BWP with the decoded location and bandwidth and the decoded subcarrier spacing.

Example 62 includes the at least one machine readable storage medium of Example 61, further comprising instructions that when executed perform: transmitting data or control information in the BWP.

Example 63 includes the at least one machine readable storage medium of Example 61, further comprising instructions that when executed perform: decoding an offset of a number of physical resource blocks (PRBs) to an absolute frequency location to determine the location.

Example 64 includes the at least one machine readable storage medium of Example 63, wherein the bandwidth is the number of physical resource blocks (PRBs).

Example 65 includes the at least one machine readable storage medium of Example 61, further comprising instructions that when executed perform: decoding the predetermined location and the bandwidth and the subcarrier spacing for a plurality of BWPs configurations.

Example 66 includes the at least one machine readable storage medium of Example 65, wherein for the plurality of BWP configurations, the frequency range of a BWP configuration overlaps with a frequency range of another BWP configuration.

Example 67 includes the at least one machine readable storage medium of Example 61, further comprising instructions that when executed perform: decoding a cyclic prefix (CP) length, wherein the CP length is based on the subcarrier spacing.

Example 68 includes the at least one machine readable storage medium of Example 61, further comprising instructions that when executed perform: decoding, at the UE, a radio resource control (RRC) signal including BWP configuration information for one or more of downlink (DL) or one or more uplink (UL) BWP configurations.

Example 69 includes the at least one machine readable storage medium of Example 68, further comprising instructions that when executed perform: decoding, at the UE, the RRC signal, wherein the BWP configuration information includes the location and the bandwidth of the BWP, wherein the location and the bandwidth is comprised of a number of physical resource blocks (PRBs) relative to an absolute frequency location.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable for bandwidth part (BWP) switching, the apparatus comprising:
one or more processors configured to:
decode BWP configuration information via a radio resource control (RRC) signal, wherein the BWP configuration information includes a timer value and N BWP configurations, wherein N is a positive integer;
identify a default BWP from the N BWP configurations;
identify the timer value used to switch a user equipment (UE) from one of the N BWP configurations to the default (DL) BWP;
start a switching timer corresponding to the timer value, at the UE, when the UE switches to an active DL BWP that is not the default DL BWP; and
switch the UE from the active DL BWP to the default DL BWP upon expiration of the switching timer; and
a memory interface configured to send the configuration information to a memory.

2. The apparatus of claim 1, further comprising a transceiver configured to:
receive the configuration information via the RRC signal.

3. The apparatus of claim 1, wherein the one or more processors are further configured to: restart the switching timer, at the UE, when the UE successfully decodes control information.

4. The apparatus of claim 3, wherein the control information comprises downlink control information (DCI) used to schedule physical downlink shared channel (PDSCH) in the active DL BWP.

5. The apparatus of claim 1, wherein the one or more processors are further configured to:
determine, at the UE, an active DL BWP.

6. The apparatus of claim 1, wherein the UE includes an antenna, a touch sensitive display screen, a speaker, a microphone, a graphics processor, an application processor, an internal memory, a non-volatile memory port, or combinations thereof.

7. An apparatus of a user equipment (UE) operable for bandwidth part (BWP) configuration, the apparatus comprising:
one or more processors configured to:
decode, at the UE, a radio resource control (RRC) signal including BWP configuration information for one or more of downlink (DL) or uplink (UL) BWP configurations, wherein the BWP configuration information comprises:
subcarrier spacing for the BWP,
a timer value corresponding to a switching timer for switching the UE from an active DL BWP to a default DL BWP, the switching timer starting when the UE switches to the active DL BWP that is not the default DL BWP, and
location and bandwidth of the BWP;
encode, at the UE, one or more of data or control information, using the BWP configuration information, for transmission to a next generation node B (gNB); and
decode, at the UE, one or more of data or control information, using the BWP configuration information, received from the gNB; and
a memory interface configured to send the BWP configuration information to a memory.

8. The apparatus of claim 7, wherein the one or more processors are further configured to:
decode, at the UE, the RRC signal including the BWP configuration information, wherein the BWP configuration information includes N BWP configurations, wherein N is a positive integer.

9. The apparatus of claim 8, wherein for the N BWP configurations there is one active DL BWP and one active UL BWP.

10. The apparatus of claim 8, wherein N is a maximum number of DL BWP configurations and a maximum number of UL BWP configurations.

11. The apparatus of claim 10, wherein N is 4.

12. The apparatus of claim 8, wherein the one or more processors are further configured to: decode, at the UE, the RRC signal including the location and the bandwidth of the BWP, wherein the location and the bandwidth is comprised of a number of physical resource blocks (PRBs) relative to an absolute frequency location.

13. The apparatus of claim 7, wherein the one or more processors are further configured to:
decode, at the UE, the RRC signal, wherein the RRC signal comprises a cyclic prefix (CP).

14. The apparatus of claim 7, wherein the one or more processors are further configured to:
decode, at the UE, the RRC signal including the BWP configuration information for one or more of the DL or the UL BWP configurations, wherein the one or more DL BWP configurations are configured separately from the one or more UL BWP configurations.

15. The apparatus of claim 8, wherein for the N BWP configurations, the frequency range of a BWP configuration overlaps with the frequency range of another BWP configuration.

16. An apparatus of a next generation node B (gNB) operable for bandwidth part (BWP) configuration, the apparatus comprising:
one or more processors configured to:
encode, at the gNB, a radio resource control (RRC) signal including BWP configuration information for one or more of downlink (DL) or uplink (UL) BWP configurations, wherein the BWP configuration information comprises:
subcarrier spacing for the BWP,
a timer value corresponding to a switching timer for switching the UE from an active DL BWP to a default DL BWP, the switching time starting when the UE switches to the active DL BWP that is not the default DL BWP, and
location and bandwidth of the BWP, decode, at the gNB, one or more of data or control information, using the BWP configuration information, received from a user equipment (UE); and encode, at the gNB, one or more of data or control information, using the BWP configuration information, for transmission to the UE; and a memory interface configured to send the BWP configuration information to a memory.

17. The apparatus of claim 16, wherein the one or more processors are further configured to:

encode, at the gNB, the RRC signal including the BWP configuration information, wherein the BWP configuration information includes N BWP configurations, wherein N is a positive integer.

18. The apparatus of claim 17, wherein for the N BWP configurations there is one active DL BWP and one active UL BWP.

19. The apparatus of claim 17, wherein N is a maximum number of DL BWP configurations and a maximum number of UL BWP configurations.

20. The apparatus of claim 19, wherein N is 4.

21. The apparatus of claim 16, wherein the one or more processors are further configured to:

encode, at the gNB, the RRC signal including the location and the bandwidth of the BWP, wherein the location and the bandwidth is comprised of a number of physical resource blocks (PRBs) relative to an absolute frequency location.

22. The apparatus of claim 16, wherein the one or more processors are further configured to:

encode, at the gNB, the RRC signal, wherein the RRC signal comprises a cyclic prefix (CP).

23. The apparatus of claim 16, wherein the one or more processors are further configured to:

encode, at the gNB, the RRC signal including the BWP configuration information for one or more of the DL or the UL BWP configurations, wherein the one or more DL BWP configurations are configured separately from the one or more UL BWP configurations.

* * * * *

UNITED STATES PATENT AND TRADEMARK OFFICE
CERTIFICATE OF CORRECTION

| | | |
|---|---|---|
| PATENT NO. | : 11,310,861 B2 | Page 1 of 1 |
| APPLICATION NO. | : 16/484802 | |
| DATED | : April 19, 2022 | |
| INVENTOR(S) | : Jeongho Jeon et al. | |

It is certified that error appears in the above-identified patent and that said Letters Patent is hereby corrected as shown below:

In the Claims

Column 27, Line 37, "a memory interface configured to send the configuration" should be amended in Claim 1 to read as:
--a memory interface configured to send the BWP configuration--.

Column 27, Line 41, "receive the configuration information via the RRC signal." should be amended in Claim 2 to read as:
--receive the BWP configuration information via the RRC signal.--.

Signed and Sealed this
Fifteenth Day of July, 2025

Coke Morgan Stewart
*Acting Director of the United States Patent and Trademark Office*